(12) United States Patent
Savry

(10) Patent No.: US 11,341,282 B2
(45) Date of Patent: *May 24, 2022

(54) METHOD FOR THE EXECUTION OF A BINARY CODE OF A SECURE FUNCTION BY A MICROPROCESSOR

(71) Applicant: Commissariat a l'Energie Atomique et aux Energies Alternatives, Paris (FR)

(72) Inventor: Olivier Savry, Grenoble (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 64 days.

This patent is subject to a terminal disclaimer.

(21) Appl. No.: 16/866,619

(22) Filed: May 5, 2020

(65) Prior Publication Data

US 2020/0349294 A1    Nov. 5, 2020

(30) Foreign Application Priority Data

May 9, 2019    (FR) ..................................... 19 04818

(51) Int. Cl.
*G06F 21/60* (2013.01)
*G06F 21/75* (2013.01)
(Continued)

(52) U.S. Cl.
CPC ............... *G06F 21/75* (2013.01); *G06F 8/44* (2013.01); *G06F 9/30054* (2013.01); *H04L 9/06* (2013.01); *G06F 7/57* (2013.01); *H04L 2209/04* (2013.01)

(58) Field of Classification Search
CPC ............. H04L 9/06; G06F 7/57; G06F 21/556
See application file for complete search history.

(56) References Cited

U.S. PATENT DOCUMENTS 10,223,527 B2 *  3/2019  Farchi .................. G06F 21/554
10,740,452 B2 *  8/2020  Hosie ..................... G06F 21/42
(Continued)

FOREIGN PATENT DOCUMENTS

EP    3 457 620 A1    3/2019
FR    3 065 095 A1    10/2018

OTHER PUBLICATIONS

French Preliminary Search Report dated Apr. 7, 2020 in French Application 19 04818 filed May 5, 2019 (with English Translation of Categories of Cited Documents and Written Opinion), 5 pages.

*Primary Examiner* — Wasika Nipa
(74) *Attorney, Agent, or Firm* — Oblon, McClelland, Maier & Neustadt, L.L.P.

(57) ABSTRACT

A method for executing a binary code includes for each item of data to be recorded: executing an algorithm for constructing a data line containing a cryptogram of this item of data constructed using an initialization vector $iv_j$ associated with an address $@_j$ of the main memory using a relationship $iv_j = F_{iv}(@_j)$, where the function $F_{iv}$ is a pre-programmed function that associates a different initialization vector $iv_j$ with each different address $@_j$ of a main memory, and then recording this constructed data line in the main memory at the address $@_j$, where each instruction line of a basic block is constructed by executing the same construction algorithm as the one executed to construct the data line and using the same function $F_{iv}$, the item of data for this purpose being taken to be equal to the instruction masked using a mask associated with this basic block.

13 Claims, 6 Drawing Sheets

(51) Int. Cl.
  *G06F 8/41*   (2018.01)
  *G06F 9/30*   (2018.01)
  *H04L 9/06*   (2006.01)
  *G06F 7/57*   (2006.01)

(56) References Cited

U.S. PATENT DOCUMENTS

| | | |
|---|---|---|
| 2003/0046563 A1 | 3/2003 | Ma et al. |
| 2009/0235090 A1 | 9/2009 | Chang |
| 2010/0194609 A1* | 8/2010 | Meyer ................. G06F 11/1008 341/52 |
| 2010/0241841 A1* | 9/2010 | Buer ....................... G06F 21/72 713/2 |
| 2011/0078420 A1* | 3/2011 | Trescher ................ G06F 21/77 712/221 |
| 2017/0214523 A1* | 7/2017 | Pebay-Peyroula .... H04L 9/0668 |
| 2019/0080096 A1 | 3/2019 | Savry |
| 2019/0087566 A1* | 3/2019 | Hosie ................... G06F 21/125 |

* cited by examiner

METHOD FOR THE EXECUTION OF A BINARY CODE OF A SECURE FUNCTION BY A MICROPROCESSOR

The invention relates to a method for the execution of a binary code of a secure function by a microprocessor. The invention also relates to:

a binary code of a secure function, an information recording medium and a microprocessor for implementing this execution method, and a compiler for generating this binary code.

Numerous attacks are possible in order to obtain information about a binary code or cause unexpected operation of the binary code. For example, attacks known under the name "fault injection" or "fault attack" may be implemented. These attacks involve disrupting the operation of the microprocessor or the memory containing the binary code, using various physical means such as modifying supply voltages, modifying the clock signal, exposing the microprocessor to electromagnetic waves, inter alia.

Using such attacks, an attacker is able to alter the integrity of machine instructions or data in order for example to recover a secret key of a cryptographic system, bypass security mechanisms such as verification of a PIN code during authentication, or simply prevent the execution of a function essential to the security of a critical system.

These attacks may notably cause three types of fault, called execution faults, when the binary code is executed:
1) altering the instructions of the machine code that is executed,
2) altering the data stored in the main memory or in registers of the microprocessor, and
3) altering the control flow of the machine code.

The control flow corresponds to the execution path that is followed when the machine code is executed. The control flow is conventionally depicted in the form of a graph, known under the name "control flow graph".

The binary code of a function may be instrumented so as to allow execution faults to be detected and signaled. When the binary code of a function is instrumented in this way, this binary code is called "binary code of a secure function". Specifically, unlike the binary code of a non-secure function, this binary code is able to allow signaling of execution faults that are typically encountered in the event of attacks.

Prior art regarding this subject is known from application EP3457620A1. In this application, each data line $LD_j$ recorded in the main memory at an address $@_j$ contains a cryptogram $CD_j^*$ of the item of data $D_j$ recorded in the memory. This cryptogram $CD_j^*$ is constructed using an initialization vector $iv_j$ that depends on the address $@_j$ at which the line $LD_j$ is recorded. Next, in response to the execution of an instruction to load a data line from the address $@_j$, a vector $iv_j$ is constructed from this address $@_j$. Next, the cryptogram $CD_j^*$ contained in the loaded line is decrypted using the constructed vector $iv_j$. If the line $LD_j$ was constructed in order to be recorded at an address $@_{jd}$ and then moved to the address $@_j$ without this movement being performed by the microprocessor, then the constructed vector $iv_j$ is not the same as the one used to construct the cryptogram $CD_j^*$. The decryption of the item of data $D_j$ is therefore incorrect in this case. This incorrect decryption triggers signaling of an execution fault. The method described in application EP3457620A1 thus makes it possible to detect malicious movement of a data line.

In addition, in application EP3457620A1, each instruction line $LI_j$ recorded in the main memory contains a cryptogram $CI_j^*$ of the instruction to be executed. This cryptogram $CI_j^*$ is constructed using a vector $iv_k$ associated with the basic block $BB_k$ that contains this instruction line. The correct value of the vector $iv_k$ to be used to decrypt the instruction lines of the block $BB_k$ is loaded to the microprocessor only when the previous basic block $BB_{k-1}$ is executed. Thus, if an attacker causes the control flow to be bypassed, which leads to a block $BB_t$ being executed instead of the block $BB_k$, then the instructions lines of the block $BB_t$ are not decrypted correctly. Specifically, in this case, it is the vector $iv_k$ that is used to decrypt the instruction lines of the block $BB_t$, and not the vector $iv_t$ associated with this block $BB_t$. By virtue of this, the method of application EP3457620A1 makes it possible to verify the integrity of the control flow.

In parallel with the execution of the secure function, the microprocessor may execute a phase of rearranging the main memory. Such a phase of rearranging the main memory makes it possible to reorganize the arrangement of the lines of the main memory. This phase makes it possible for example to optimize the operation of the main memory and/or to allocate some of the main memory to a new program to be executed. Executing this rearrangement phase normally leads to the instruction and data lines moving. More precisely, for each line to be moved, an instruction to load this line to the microprocessor is executed. Next, an instruction to record the loaded line at another location in the main memory is executed. In other words, each moved line is processed as if it were a data line. Therefore, as described in application EP3457620A1, execution of the load instruction by the microprocessor notably triggers the verification that the cryptogram $CD_j^*$ contained in the loaded line was actually constructed using the vector $iv_j$ corresponding to the address $@_j$ from which this line was loaded. If the moved line is a data line, this verification, during normal operation, does not trigger signaling of an execution fault. The movement of data lines thus does not pose any particular problem.

On the other hand, if the moved line is an instruction line, then the microprocessor verifies whether the cryptogram $CI_j^*$ was actually constructed from the vector $iv_j$ corresponding to the address $@_j$ from which this line was loaded. Now, this is never the case since the cryptogram $CI_j^*$ is constructed using the vector $iv_k$ associated with the basic block $BB_k$ to which this line belongs. The vector $iv_k$ is independent of the address $@_j$. Moving an instruction line therefore automatically causes signaling of an execution fault. In other words, it is not possible to move instruction lines.

This application EP3457620A1 also discloses a variant in which the cryptogram $CI_j^*$ of each instruction line is constructed in the same way as the cryptogram $CD_j^*$. The cryptogram $CI_j^*$ is therefore constructed by encrypting the concatenation $CI_j$ using the vector $iv_j$ corresponding to the address $@_j$ where this instruction line is recorded in the main memory. In this variant, the vector $iv_k$ is no longer used. This variant is beneficial because, in this case, moving instruction lines in the rearrangement phase no longer automatically triggers signaling of an execution fault. On the other hand, in this variant, it is no longer possible to verify the integrity of the control flow since the vector $iv_k$ is no longer able to be used.

The aim here is to propose a method for executing a binary code of a secure function that offers, at least simultaneously, the following possibilities:

securing the data and, in particular, securing the data against
  malicious movements of these data in the main memory,
securing the machine code against attacks that cause bypass-
  ing of the control flow, and making it possible to execute the phase of rearranging the lines of the main memory, even if it is necessary to move instruction lines in order to do so.

One subject of the invention is therefore such a method for the execution of a binary code of a secure function by a microprocessor.

Another subject of the invention is a binary code of a secure function able to be executed by a microprocessor.

Another subject of the invention is an information recording medium able to be read by a microprocessor, this information recording medium containing the binary code.

Another subject of the invention is a microprocessor for implementing the execution method.

Finally, another subject of the invention is a compiler able to automatically convert a source code of a secure function into a binary code.

The invention will be better understood on reading the following description, provided solely by way of non-limiting example and with reference to the drawings, in which.

Figure 1:
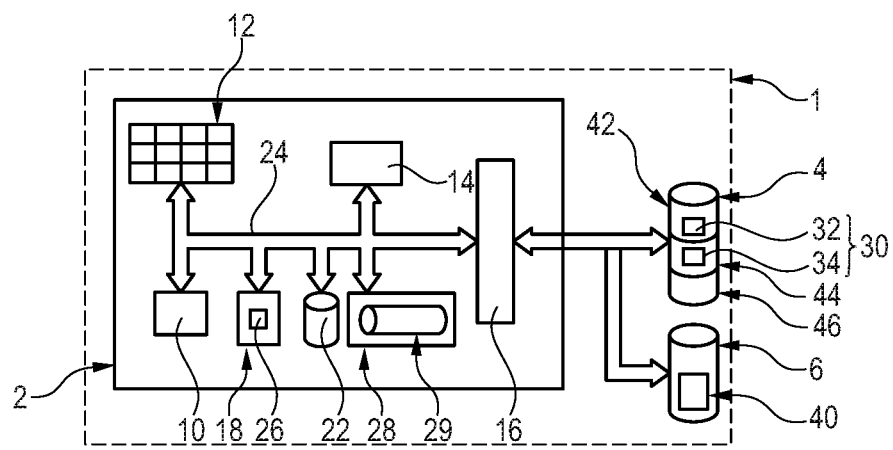
FIG. 1 is a schematic illustration of the architecture of an electronic apparatus able to execute a binary code of a secure function.

Section I: Conventions, Notations and Definitions:

In the figures, the same references are used to denote the same elements. In the rest of this description, features and functions that are well known to those skilled in the art will not be described in detail.

In this description, the following definitions are adopted.

A "program" denotes a set of one or more predetermined functions that it is desired to have executed by a microprocessor.

A "source code" is a representation of the program in a computer language, not being able to be executed directly by a microprocessor and being intended to be converted, by a compiler, into a machine code able to be executed directly by the microprocessor.

A program or a code is said to be "able to be executed directly" or "directly executable" when it is able to be executed by a microprocessor without this microprocessor needing to compile it beforehand by way of a compiler or to interpret it by way of an interpreter.

An "instruction" denotes a machine instruction able to be executed by a microprocessor. Such an instruction consists:

of an opcode, or operation code, that codes the nature of the operation to be executed, and of one or more operands defining the value(s) of the parameters of this operation.

A "machine code" is a set of machine instructions. This typically involves a file containing a sequence of bits bearing the value "0" or "1", these bits coding the instructions to be executed by the microprocessor. The machine code is able to be executed directly by the microprocessor, that is to say without the need for a preliminary compilation or interpretation.

A "binary code" is a file containing a sequence of bits bearing the value "0" or "1". These bits code data and instructions to be executed by the microprocessor. The binary code thus comprises at least one machine code and also, in general, digital data processed by this machine code.

An "instruction flow" is a sequence of instructions organized one after another and that forms an ordered sequence of bits in the machine code. The instruction flow starts with an initial instruction and ends with a final instruction. With respect to a given instruction in the instruction flow, the instructions situated on the side of the initial instruction are called "previous instructions" and the instructions situated on the side of the final instruction are called "following instructions". In this text, this instruction flow in the memory is divided into a sequence of basic blocks that are immediately consecutive or separated by data blocks.

In this text, a "basic block" is a group of successive instructions of the instruction flow that starts at a branch address and that ends with a single explicit branch instruction. An explicit branch instruction is characterized by the explicit presence of an opcode in the machine code that codes the branch instruction. The execution of a basic block thus automatically starts with the execution of its first instruction and automatically ends with the execution of the branch instruction that ends this basic block. A basic block does not contain any other branch instructions than the one situated at the end of this basic block. The instructions of a basic block are thus automatically all read by the microprocessor one after another in the order in which they are present in this basic block. The branch instruction, when it is executed, may automatically direct the control flow to the same branch address or, alternatively, to different branch addresses. The latter scenario occurs for example when, at the end of the executed basic block, the control flow is able to continue to a first and, alternatively, to a second basic block.

A "branch instruction" is an instruction that, when it is executed by the microprocessor, triggers a jump to the branch address of another basic block. Typically, for this purpose, this instruction replaces the current value of the ordinal counter with the value of the branch address. It is recalled that the ordinal counter contains the address of the next instruction to be executed by the microprocessor. In the absence of a branch instruction, each time an instruction is executed, the ordinal counter is incremented by the size of the instruction currently being executed. In the absence of a branch instruction, the instructions are automatically executed sequentially one after another in the order in which they are recorded in a main memory. The branch instruction may be unconditional, that is to say that the jump to the branch address is performed automatically as soon as this instruction is executed. An unconditional branch instruction is for example the instruction "JAL" in the set of instructions "RISC V". The branch instruction may also be conditional, that is to say that the jump to the branch address is triggered only if a particular condition is met. For example, a conditional branch instruction is an instruction "BRANCH" in the set of instructions "RISC-V". The branch instruction may equally be a call to a function. In this text, unless indicated otherwise, the term "branch instruction" denotes both direct and indirect branch instructions. A direct branch instruction is a branch instruction that directly contains the numerical value of the branch address. An indirect branch instruction is a branch instruction to a branch address contained in a memory or a register of the microprocessor. Thus, unlike a direct branch instruction, an indirect branch instruction does not directly contain the numerical value of the branch address. For example, an indirect branch instruction is the instruction "JALR" from the set of instructions RISC-V.

A "branch address" is the address in the main memory where the first instruction line of a basic block is located.

Reference is made to execution of a function to denote the execution of the instructions performing this function.

For the sake of simplicity, in this description and in the figures, the instructions are not shown in binary form, but rather in a symbolic form expressed in a sophisticated higher-level language.

Section II: Architecture of the Apparatus:

FIG. 1 shows an electronic apparatus 1 comprising a microprocessor 2, a main memory 4 and a mass storage medium 6. For example, the apparatus 1 is a computer, a smartphone, an electronic tablet or the like.

The microprocessor 2 in this case comprises:
an arithmetic and logic unit 10;
a set 12 of registers;
a control module 14;
a data input/output interface 16,
an instruction loader 18 having an ordinal counter 26,
a queue 22 of instructions to be executed, and
a hardware security module 28.

The memory 4 is configured so as to store instructions and data of a binary code 30 of a program to be executed by the microprocessor 2. The memory 4 is a random access memory. The memory 4 is typically a volatile memory. The memory 4 may be a memory external to the microprocessor 2, as shown in FIG. 1. In this case, the memory 4 is formed on a substrate that is mechanically separate from the substrate on which the various elements of the microprocessor 2, such as the unit 10, are formed.

The memory 4 is divided here into successive data words of fixed length. Each data word may be transferred in a single clock cycle from the memory 4 to a register of the microprocessor. To this end, the size $N_{MM}$ of a data word is equal to the maximum number of bits able to be transferred simultaneously from the memory 4 to a register of the set 12. The size $N_{MM}$ is strictly greater here than $N_{inst}$ bits, where $N_{inst}$ bits is the number of bits of the instructions in the set of instructions of the microprocessor 2. $N_{inst}$ is typically an integer greater than or equal to 8, 16, 32 or 64. In this example, $N_{inst}$ is equal to 32 and the size $N_{MM}$ is equal to 128 bits.

The memory 4 is conventionally divided primarily into three parts:
a first part 42 containing the instructions to be executed,
a second part 44 containing the data to be processed, and
a third part 46 used to save the execution context of a function when it calls another function.

The part 46 is known by the name "execution stack" or "call stack". The part 46 is therefore also called "stack 46" hereinafter.

The binary code 30 contains notably a machine code 32 of a secure function and a block 34 of data necessary to execute the binary code 30. The machine code 32 and the block 34 are recorded in the parts 42 and 44, respectively.

Each secure function corresponds to a set of several lines of code, for example several hundred or thousand lines of code, stored at successive addresses in the memory 4. Each line of code corresponds here to a data word. A line of code is thus loaded to a register of the microprocessor 2 in a single read operation. Likewise, a line of code is written to the memory 4 by the microprocessor 2 in a single write operation. Each line of code corresponds to a single instruction or to a single item of data. Hereinafter, when the line of code contains an instruction, it is called "instruction line". When the line of code contains an item of data, it is called "data line". The structures of an instruction line and of a data line are described in detail with reference to FIGS. 2 and 8.

The block 34 is typically situated within a predetermined address range at the start of the binary code 30. The execution of the binary code 30 thus starts with loading and processing the data in the block 34. The block 34 in this case in particular contains:
a cryptogram ka* obtained by encrypting a key ka using a public key $pk_{CPU}$ of the microprocessor 2, and
cryptograms $iv_{msbd}$*, $iv_{cted}$*, $MASK_c$*, encrypted using the public key $pk_{CPU}$, of various values intended to initialize the content of the various registers of the microprocessor 2 in order to allow the binary code 30 to be decrypted.

By way of illustration, the microprocessor 2 is in accordance with the RISC ("Reduced Instructions Set Computer") architecture, and it implements the set of instructions "RISC-V".

The unit 10 here is an $N_{inst}$-bit arithmetic and logic unit.

The loader 18 loads the next instruction to be executed by the unit 10 to the queue 22 from the part 42 of the memory 4. More precisely, the loader 18 loads the instruction to which the ordinal counter 26 points.

The unit 10 is notably configured so as to execute the instructions loaded to the queue 22 one after another. The instructions loaded to the queue 22 are generally automatically executed in the order in which these instructions were recorded in this queue 22. The unit 10 is also capable of recording the result of these executed instructions in one or more of the registers of the set 12.

In this description, "execution by the microprocessor 2" and "execution by the unit 10" will be used as synonyms.

The module 14 is configured so as to move data between the set 12 and the interface 16. The interface 16 is notably able to acquire data and instructions, for example from the memory 4 and/or the medium 6 that are external to the microprocessor 2.

The module 28 is capable of automatically executing the various operations described in detail in the following sections in order to secure the execution of the secure functions. The module 28 operates independently and without using the unit 10. It is thus capable of processing the lines of code before and/or after they are processed by the unit 10. To this end, it comprises in particular a secure non-volatile memory 29. There is no provision to access this memory 29 without passing via the module 28. In this embodiment, the module 28 is pre-programmed, for example when it is designed, to execute operations such as the following operations:
verify the integrity and the authenticity of an item of data based on a message authentication code (better known by the acronym MAC),
construct a message authentication code,
encrypt an item of data in order to obtain a cryptogram,
decrypt a cryptogram in order to obtain an item of data in open form, execute a pre-programmed function $F_{iv}$, and
execute a pre-programmed function $F_e$.

Figure 7:
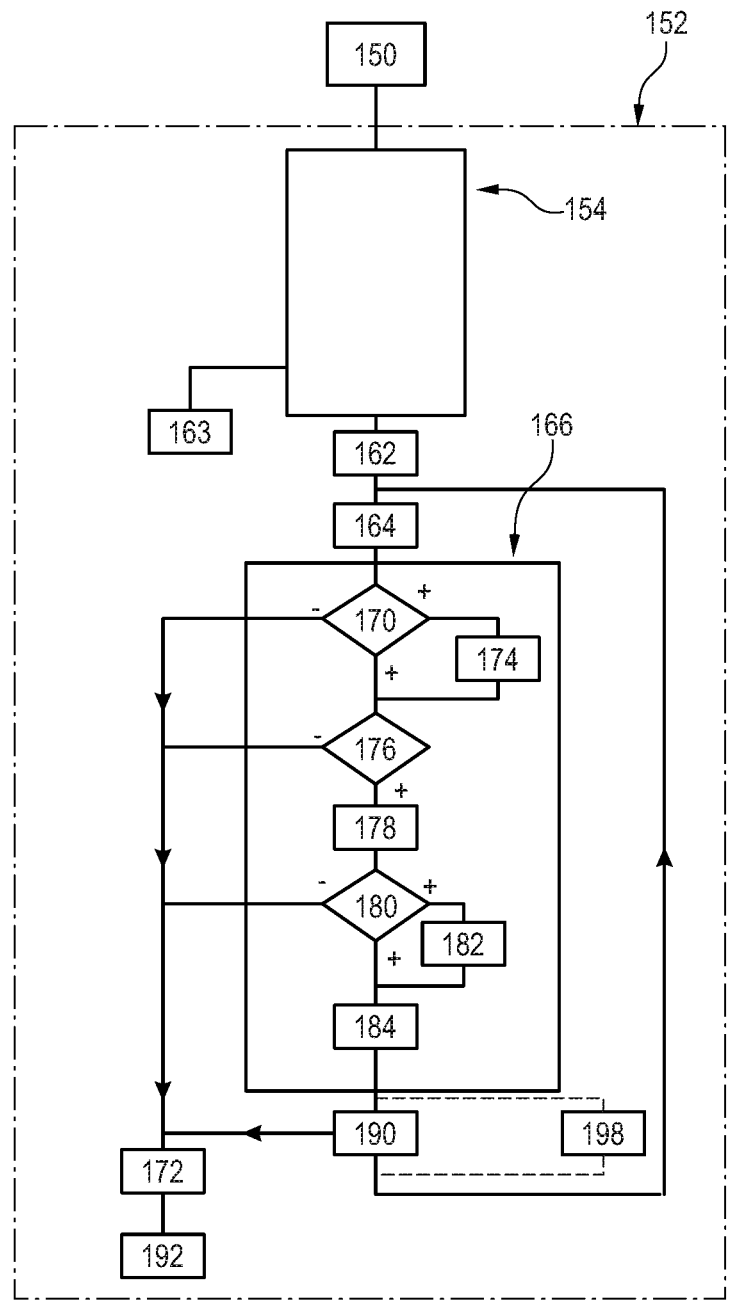
FIG. 7 is a flowchart of a method for executing the binary code of the secure function.

The memory 29 is used to store the secret information required to implement the method of FIG. 7. In this case, it therefore contains notably secret information that is pre-recorded before the start of the execution of the binary code 30. In particular, it contains the following pre-recorded information:

a secret key k' used to verify the message authentication codes, a secret private key $sk_{CPU}$ that makes it possible to decrypt the data that were encrypted using the public key $pk_{CPU}$.

In this exemplary embodiment, the set 12 contains general registers able to be used to store any type of data. The size of each of these registers is for example equal to $N_{MM}$.

A data exchange bus 24 that connects the various components of the microprocessor 2 to one another is shown in FIG. 1 in order to indicate that the various components of the microprocessor are able to exchange data with one another.

The medium 6 is typically a non-volatile memory. It is for example an EEPROM or Flash memory. In this case, it contains a backup copy 40 of the binary code 30. It is typically this copy 40 that is automatically copied to the memory 4 in order to restore the code 30, for example after a power outage or the like or just before the execution of the code 30 starts.

Section III: Securing The Machine Code:

The structure of the machine code of the secure function is described here in the specific case of the machine code 32. However, what is described in this specific case is easily transposed to any machine code of a secure function.

The machine code 32 contains a sequence of instruction lines $LI_j$ recorded one after another in the memory 4. Hereinafter, in this section, the index j is used to identify the instruction line $LI_j$ from among the other instruction lines of the machine code 32. In addition, the index j is also used as an order number indicating the order in which the lines $LI_j$ are organized. $LI_{j+1}$ thus denotes the instruction line situated immediately after the line $LI_j$. Each instruction line $LI_j$ codes one instruction from the set of instructions of the microprocessor 2 able to be executed after having been decrypted and decoded by the unit 10 of this microprocessor.

The structures of all of the lines $LI_j$ are identical. This structure is shown in detail in FIG. 2 in the specific case of the line $LI_j$.

The line $LI_j$ contains a cryptogram $CI_j^*$, a code $MAC_j$ and a code $ECC_{Lj}$. Hereinafter, $@_j$ denotes the address in the memory 4 where the line $LI_j$ is recorded.

The cryptogram $CI_j^*$ is obtained by encrypting a concatenation $CI_j$ using the secret key ka and an initialization vector $iv_j$. More precisely, the cryptogram $CI_j^*$ is obtained using the following relationship: $CI_j^* = f_{ka}(CI_j; iv_j)$, where $f_{ka}$ is an encryption function corresponding to a decryption function $f_{ka}^{-1}$ that is pre-programmed in the module 28. The function $f_{ka}$ is typically a symmetrical encryption function. Therefore, the key ka for decrypting the cryptogram $CI_j^*$ is pre-recorded in the memory 29 in order to allow the module 28 to decrypt this cryptogram $CI_j^*$.

The vector $iv_j$ is a vector whose value depends on the address $@_j$. In this embodiment, the vector $iv_j$ is coded on 128 bits. The 32 most significant bits are recorded in a register $iv_{msbd}$. The 32 least significant bits are recorded in a register $iv_{lsbd}$. The 64 bits situated between the 32 least significant bits and the 32 most significant bits are recorded in one or more registers collectivity denoted by the term "register $iv_{cted}$". Each vector $iv_j$ is therefore the result of the concatenation of the bits in the registers $iv_{msbd}$, $iv_{cted}$ and $iv_{lsbd}$. In this case, the contents of the registers $iv_{msbd}$ and $iv_{cted}$ are constant throughout the entire execution of the machine code. For example, the registers $iv_{msbd}$ and $iv_{cted}$ are loaded with these constant values at the start of the execution of the machine code 32. These constant values are obtained by decrypting the cryptograms $iv_{msbd}^*$ and $iv_{cted}^*$ contained in the block 34.

The content of the register $iv_{lsbd}$, used when encrypting the concatenation $CI_j$, depends on the address $@_j$ where the line $LI_j$ is stored. To this end, the module 28 contains a pre-programmed objective function $F_{iv}$, which associates a different value of the register $iv_{lsbd}$ with each address $@_j$ of the memory 4. For example, the function $F_{iv}$ is a hash function or encryption function. This therefore gives the following relationship: $iv_{lsbd} = F_{iv}(@_j)$, where $iv_{lsbd}$ denotes the content of the register $iv_{lsbd}$.

The concatenation $CI_j$ is in this case the concatenation of a masked instruction $I_j^M$ and of a code $ECC_{IjM}$. The masked instruction $I_j^M$ is constructed from an instruction $I_j$ to be executed by the microprocessor 2 and from a derived mask $M_j$. For example, the masked instruction $I_j^M$ is the result of the operation $I_j$ XOR $M_j$, where the symbol XOR denotes the "EXCLUSIVE OR" Boolean operation. The mask $M_j$ is obtained using the function $F_e$ in the same way as described further on with reference to operation 184. The code $ECC_{IjM}$ makes it possible to detect an error in the masked instruction $I_j^M$ and, possibly, to correct this error. For example, the code $ECC_{IjM}$ may be the code known by the acronym BCH (Bose, Ray-Chaudhuri, Hocquenghem), which has the advantage of being particularly easy to implement. However, any other known error detection or correction code may be used. The size of the code $ECC_{IjM}$ is greater than or equal to 1 or 2 or 3 bits, and generally less than $N_{inst}$. The size of the code $ECC_{IjM}$ is determined depending on the desired robustness. The more it is desired to have the ability to correct a high number of incorrect bits in the masked instruction $I_j^M$, the larger the size of the code $ECC_{IjM}$ will be.

The code $MAC_j$ is a code for verifying the integrity and the authenticity of the cryptogram $CI_j^*$. This code is commonly called message authentication code and known by the acronym MAC. Such a code $MAC_j$ is obtained by constructing a tag from the cryptogram $CI_j^*$ that normally contains fewer bits than the cryptogram $CI_j^*$. This tag is constructed using a predetermined function and the secret key k' known only to the author of the binary code 30 and to the microprocessor 2. The key k' is in this case pre-recorded in the memory 29. For example, the predetermined function is a hash function. In this case, generally, the tag is the result of applying this hash function to a combination, for example a concatenation, of the cryptogram $CI_j^*$ and the key k'.

By way of example, an authenticated encryption algorithm is used in order to generate the cryptogram $CI_j^*$ and the code $MAC_j$. This authenticated encryption algorithm may be chosen from among the various candidates in the CAESAR ("Competition for Authenticated Encryption: Security, Applicability, and Robustness") competition, such as for example one of the algorithms denoted by the following names: "ACORN", "ASCON", "SILC", "CLOC", "JAMBU", "KETJE".

The code $ECC_{Lj}$ is an error correction code that makes it possible to detect and correct an error in the cryptogram $CI_j^*$ and the code $MAC_j$. It is constructed for example as described in the case of the code $ECC_{IjM}$.

The cryptogram $CI_j^*$ and the codes $ECC_{IjM}$, $MAC_j$ and $ECC_{Lj}$ are typically constructed when the machine code 32 is generated. To this end, when the machine code 32 is generated, a first algorithm $C_d$ for constructing an error correction code is first of all executed. This algorithm $C_d$ receives, at input, the item of data for which it has to calculate the error correction code and returns, at output, the concatenation of this item of data with its error correction code. Thus, in order to construct the concatenation $CI_j$, this algorithm $C_d$ performs the following function: $CI_j=C_d(I_j^M)$. Next, a second algorithm $F_c$ is executed in order to construct the line of code containing the cryptogram of the concatenation. This algorithm $F_c$ receives, at input, the concatenation to be coded in the line of code and the address $@_j$ of the line of code to be constructed. After having been executed, it returns, at output, the line containing the cryptogram of the concatenation. Thus, in order to construct the line $LI_j$, this algorithm $F_c$ performs the following function: $LI_j=F_c(CI_j, @_j)$. Executing the algorithm $C_d$ in order to obtain a concatenation, and then the algorithm $F_c$ in order to obtain a line of code coding this concatenation, forms an algorithm for constructing this line of code.

The machine code 32 is formed of a sequence of basic blocks that have to be executed one after another. In this case, there is a first and a second type of structure for the basic blocks. Hereinafter, basic blocks that have the structures of the first and of the second type are called "block of the first type" and "block of the second type", respectively. The first type of structure is used in the case of direct branching. The second type of structure is used in the case of indirect branching.

Figure 3:
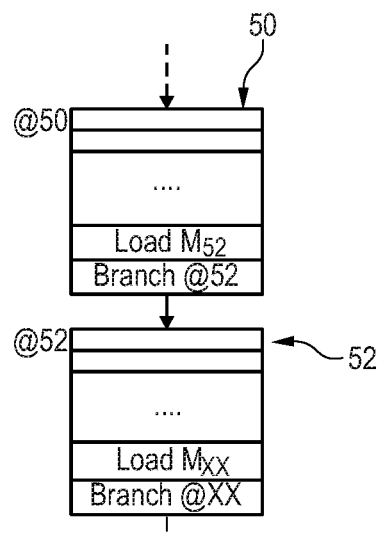
FIGS. 3 to 5 are schematic illustrations of various portions of the binary code of the secure function able to be executed by the apparatus of FIG. 1.

FIG. 3 shows the first type of structure. More precisely, FIG. 3 shows a first arrangement of two basic blocks 50 and 52 of the machine code 32. In this first arrangement, the basic blocks 50 and 52 are automatically executed one after another. In the execution order, the basic block 50 precedes the basic block 52. In this figure and the following figures: the execution order of the basic blocks is represented by an arrow that points from the previous basic block to the following basic block,
a dotted arrow that points to a depicted basic block indicates that the basic block or blocks that precede this basic block have not been depicted in order to simplify the figure,
a dotted arrow that points to an empty space from a depicted basic block indicates that the basic block or blocks following this depicted basic block have not been depicted in order to simplify the figure,
the symbol " . . . " inside a basic block indicates that all of the instruction lines of this basic block have not been depicted.

Each basic block is formed of a sequence of instruction lines that each contain the cryptogram $CI_j^*$ of the instruction $I_j$ to be executed and the codes $MAC_j$ and $ECCL_{Lj}$. In addition, each basic block starts with a branch address and ends with an instruction line that contains the cryptogram of a branch instruction. More precisely, in the case of the first type of structure, the first line of the basic block, situated at the branch address, is the first instruction line of the basic block. The basic block of the first type does not contain any data line.

Figure 2:
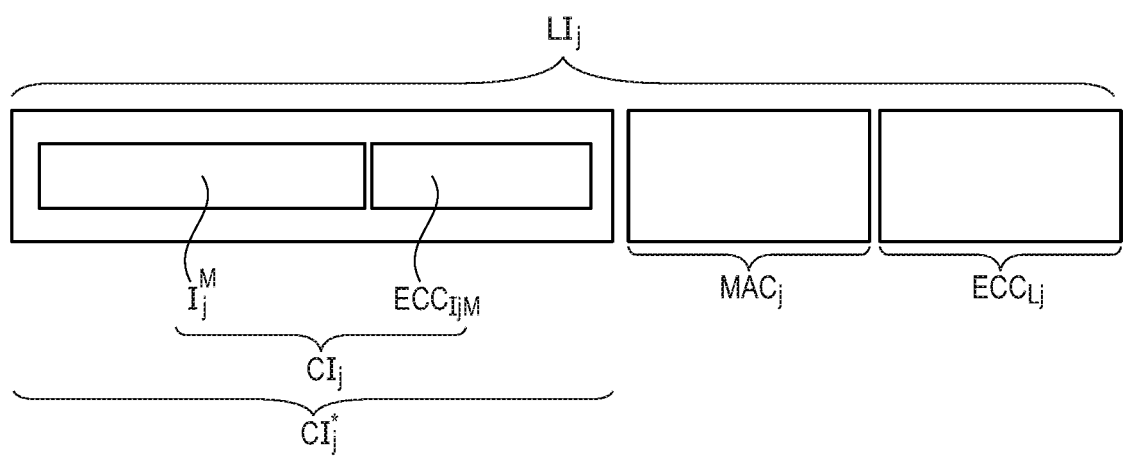
FIG. 2 is a schematic illustration of the structure of an instruction line coding an instruction of the binary code executed by the apparatus of FIG. 1.

In FIG. 2, the symbols "@50" and "@52" next to the first line of each basic block denote the branch addresses of the basic blocks 50 and 52, respectively. The symbol "@XX" denotes the branch address of another basic block not shown in FIG. 2.

The symbol "Load $M_{XX}$" indicated in the penultimate instruction line of the basic block indicates that this instruction line contains the cryptogram of a direct load instruction. When the direct load instruction is executed by the microprocessor 2, it causes loading of a new mask $M_{XX}$ to a register $MASK_{branch}$ of the microprocessor 2. The value of the mask $M_{XX}$ is contained directly in the instruction "Load $M_{XX}$". In other words, the value of the mask $M_{XX}$ is an operand of the instruction "Load $M_{XX}$". It will be noted that the value of the mask $M_{XX}$ is coded on 32 bits here, and therefore has the same length as an instruction. Thus, although this text makes reference to a direct load instruction, this instruction is in practice generally implemented in the form of a first and a second 32-bit instruction from the set of instructions of the microprocessor 2. Typically, when they are executed, the first instruction loads a first portion of the bits of the value of the mask $M_{XX}$ to the register $MASK_{branch}$ and the second instruction loads the other bits of the value of the mask $M_{XX}$ to this register $MASK_{branch}$.

The symbol "xx" in the term $M_{XX}$ is an identifier of this mask. Specifically, each time the instruction "Load $M_{XX}$" is executed, it causes loading of a specific mask that makes it possible to decrypt the instruction lines of the following basic block. The symbol "Load $M_{52}$" thus indicates that the value of the mask $M_{52}$ is loaded to the register $MASK_{branch}$ before the execution of the basic block 52 starts. Each basic block is in this case associated with its own mask.

The symbol "Branch @XX" indicated inside the last instruction line of the basic block indicates that this last line contains the cryptogram of a direct branch instruction that, when it is executed by the microprocessor 2, causes a direct branch to the branch address @XX. When it is executed, this instruction also causes loading of the value contained in the register $MASK_{branch}$ to a register $MASK_c$ of the microprocessor 2. The register $MASK_c$ contains the 32 bits of the mask currently being used to decrypt the instruction lines.

The same mask $M_k$ is used to decrypt all of the instructions of the same basic block $BB_k$. The index k unambiguously identifies the basic block $BB_k$ from among all of the basic blocks of the machine code 32. In the figures and in the description, the symbol $M_k$ is used hereinafter to generally denote the mask associated with the basic block $BB_k$. In addition, in simple cases such as the one shown in FIG. 3 in which two basic blocks follow one another in the execution order of the machine code 32, the index k is also used to indicate the order in which these basic blocks are executed. For example, in these simple cases, the notation $BB_{k-1}$ is used to denote the previous basic block automatically executed immediately before the basic block $BB_k$.

In this case, the mask $M_k$ is unique for each basic block $BB_k$. "Unique for each basic block" denotes the fact that the probability of the same mask $M_k$ being used to encrypt the instruction lines of two different basic blocks of the machine code 32 is less than one chance in 100 or in 1000. In particular, the expression "unique for each basic block" therefore covers the case in which the masks $M_k$ of all of the basic blocks are automatically different from one another. For example, in one simple embodiment, when the code 32 is generated, the 32 bits of the mask $M_k$ of each basic block are drawn randomly or pseudo-randomly from the set $\{1; \ldots; 2^{Ninst}\}$.

As shown in FIG. 3, in the code 32, the 32 bits of the mask $M_k$ are loaded to the register $MASK_{branch}$ only when a basic block preceding the basic block $BB_k$ is executed. In FIG. 3, the mask $M_{52}$ required to decrypt the instructions of the block 52 is loaded when the block 50 is executed.

Figure 4:
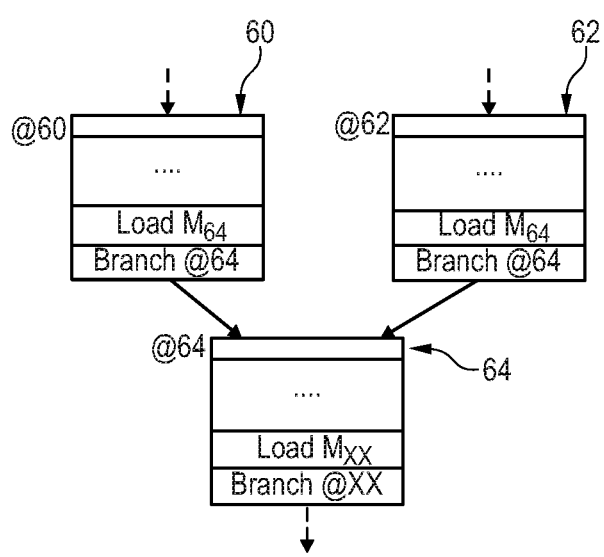

FIG. 4 shows another possible arrangement of several basic blocks of the code 32 in the specific case of two previous basic blocks 60 and 62 and one following basic block 64. The blocks 60, 62 and 64 are basic blocks of the first type. In this case, the blocks 60 and 64 are for example identical, respectively, to the blocks 50 and 52, except that the mask required to decrypt the instructions of the blocks 64 is denoted "$M_{64}$". The block 62 is constructed in the same way as the block 60 and, in particular, it ends with two instruction lines that code the same instructions as those coded in the last two lines of the block 60. However, even though these last two lines code the same instructions, the cryptograms of these instructions are different because the instructions of the block 62 are encrypted using a mask $M_{62}$ different from the mask $M_{60}$ used to encrypt the instructions of the block 60. The other instruction lines of the block 62 are different from those of the block 60.

Figure 5:
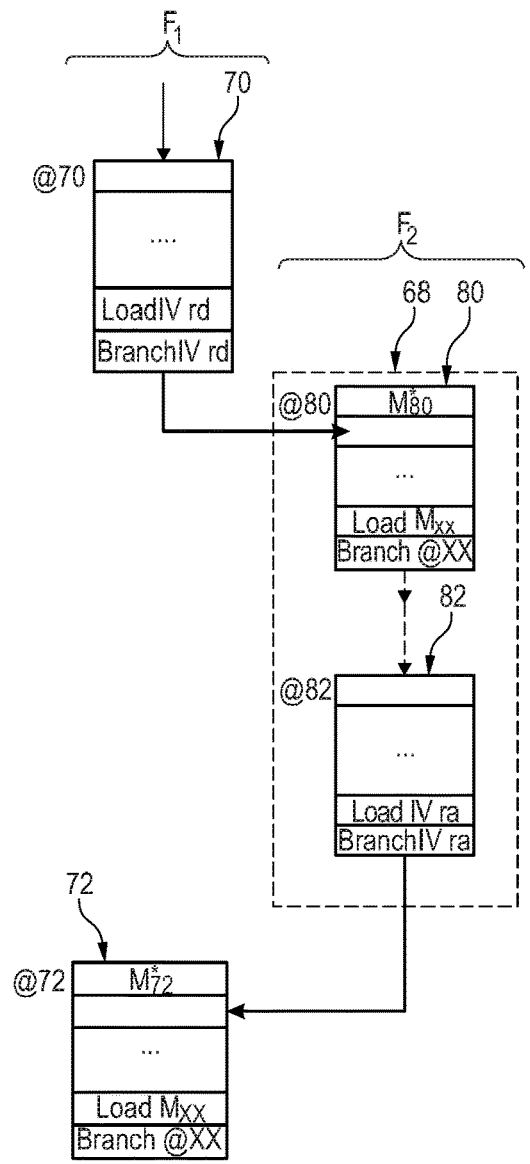

FIG. 5 shows part of the architecture of the machine code 32 when a function $F_1$ of the machine code 32 calls an external function $F_2$. To this end, the machine code of the function $F_1$ contains a basic block 70 that ends with a call to the machine code 68 of the function $F_2$.

The machine code 68 is arranged as described above for the machine code 32. It therefore consists of a sequence of basic blocks. To simplify FIG. 5, only the first basic block 80 and the last basic block 82 of this machine code 68 have been shown. In this case, when the execution of the function $F_2$ has ended, that is to say after the block 82 has been executed, the execution of the machine code 32 continues with the execution of a basic block 72 of the function $F_1$.

The blocks 70, 72, 80 and 82 are associated with respective masks $M_{70}$, $M_{72}$, $M_{80}$ and $M_{82}$.

In this case, the machine code 32 is a dynamic code that was generated independently of the machine code 68. For example, the machine code 68 was generated before or after the machine code 32 was generated. For example, the machine code 68 is the code of a function of a library of pre-recorded functions. In this case, typically, the machine code 68 may be called, at different times, by various machine codes. The address @80 of the block 80 is not known at the time when the machine code 32 is compiled. Because of this, the block 70 ends with an instruction line containing the cryptogram of an indirect branch instruction denoted "BranchIV rd" in FIG. 5. When the instruction "Branch IV rd" is executed by the microprocessor 2, it causes a jump to a branch address $@_j$ constructed from the current content of a register rd of the microprocessor 2. The address $@_j$ is typically constructed from the content of the register rd using the following relationship: $@_j$=rd+offset+4, where:

$@_j$ is the constructed address,
rd is the value contained in the register rd,
"offset" is a predetermined numerical value, and
the symbol "+4" indicates that a constant value is added to the result of the sum rd+offset such that the address $@_j$ is equal to the address of the instruction line that immediately follows the one situated at the address rd+offset. The value "offset" is conventionally passed as an operand of the instruction "BranchIV rd".

At this juncture, it will be noted that, when the sum rd+offset corresponds to the address of the first line of a basic block, the sum rd+offset+4 corresponds to the address of the second line of this basic block. Thus, unlike a conventional indirect branch instruction, the instruction "BranchIV" causes a direct jump to the second line of the following basic block. The first line of this following basic block is therefore not executed in this embodiment.

The register rd is loaded with a value for constructing the address @80. The register rd is typically loaded with the value that makes it possible to construct the address @80, at the start of the execution of the binary code 30, by a dynamic library loader, also known simply as loader. This dynamic library loader is for example that of an operating system executed by the microprocessor 2. This dynamic library loading mechanism is well known and is therefore not described here.

Likewise, since the machine code 68 to be executed is not known at the time when the machine code 32 is compiled, the mask $M_{80}$ to be used to decrypt the instruction lines of this block 80 is not known either. It is therefore not possible, when the machine code 32 is being compiled, to insert the instruction "Load $M_{80}$", described above, into the block 70 so as to cause direct loading of the mask $M_{80}$ to the register $MASK_{branch}$. Instead, when the machine code 32 is generated, an instruction to indirectly load a mask, denoted "LoadIV rd", is inserted just before the instruction "BranchIV rd". When it is executed by the microprocessor 2, the instruction "LoadIV rd" causes:

reading of the content of the data line situated at an address constructed from the content of the register rd, and then
construction of the 32 bits of the mask $M_{80}$ from the content of the read data line, and then
loading of the 32 bits thus constructed to the register $MASK_{branch}$.

In this case, in the case of the instruction "LoadIV rd", an address $@_k$ is constructed from the content of the register rd using the following relationship: $@_k$=rd+offset, where "rd" and "offset" are the same as those used in the instruction "BranchIV rd". The constructed address $@_k$ is thus the address of the first line of the following basic block. Hereinafter, the address of the first line of the basic block $BB_k$ is denoted $@_k$.

To this end, the block 80 is a basic block of the second type. A basic block $BB_k$ of the second type is identical to a basic block of the first type, except that the first line of this basic block contains a data line $LD_k$ and not an instruction line. This line $LD_k$ contains the item of data for constructing the 32 bits of the mask $M_k$ associated with the basic block $BB_k$. To this end, it contains a cryptogram, denoted $M_k^*$ in the figures, of the 32 bits of the mask $M_k$. In this embodiment, the cryptogram $M_k^*$ is obtained using the following relationship: $M_k^* = f_{ka}(M_k; iv_j)$, where:

$M_k$ is the value of the 32 bits of the mask $M_k$,
$iv_k$ is an initialization vector constructed as described above in the case of the encryption of the concatenation $CI_j$, and
the function $f_{ka}$ is the same as the one described above in the case of the encryption of the instructions.

The initialization vector $iv_j$ used to obtain the cryptogram $M_k^*$ is therefore itself also the result of the concatenation of the content of the registers $iv_{msbd}$, $iv_{cted}$ and $iv_{lsbd}$. In this case, the content of the register $iv_{lsbd}$ is equal to $F_{iv}(@_k)$, where:

$F_{iv}$ is the same function as the one defined above, and
$@_k$ is the address of the first line of the block $BB_k$.

Figure 8:
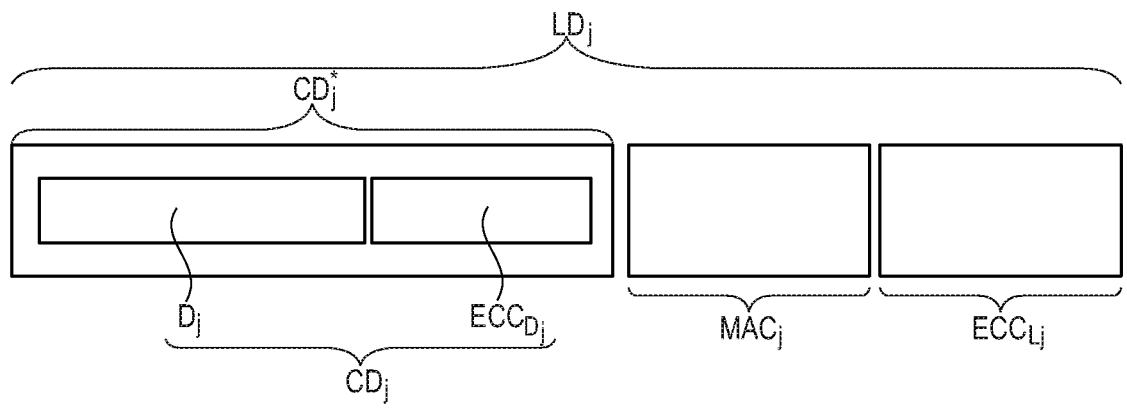
FIG. 8 is a schematic illustration of the structure of a data line of the binary code executed by the apparatus of FIG. 1.

The structure of a data line such as the line $LD_k$ is described further on with reference to FIG. 8.

The machine code 68 may be called from various basic blocks of the machine code 32 or from various machine codes. The basic block that has to be executed after the basic block 82 thus depends on the basic block that called the machine code 68. It is not known at the time when the machine code 68 is generated. Therefore, like the block 70, the basic block 82 is a basic block of the first type that ends with an instruction line that codes an instruction "LoadIV ra", followed by an instruction line that codes the instruction "BranchIV ra". The instructions "LoadIV ra" and "BranchIV ra" are identical, respectively, to the instructions "LoadIV rd" and "BranchIV rd" described above, except that the register rd is replaced with the register ra.

When the code 68 is called from the block 70, the return address @72 of the machine code 68 is typically saved in the register ra of the microprocessor 2. If the machine code 68 itself calls another function, then the address @72 is saved in the execution stack 46 and restored to the register ra just before executing the instructions "LoadIV To" and "BranchIV ra" of the block 82.

The block 72 is a basic block of the second type. Its first line at the address @72 is therefore a data line that contains the cryptogram $M_{72}{}^*$ of the mask $M_{72}$ associated with the block $BB_{72}$.

Figure 6:
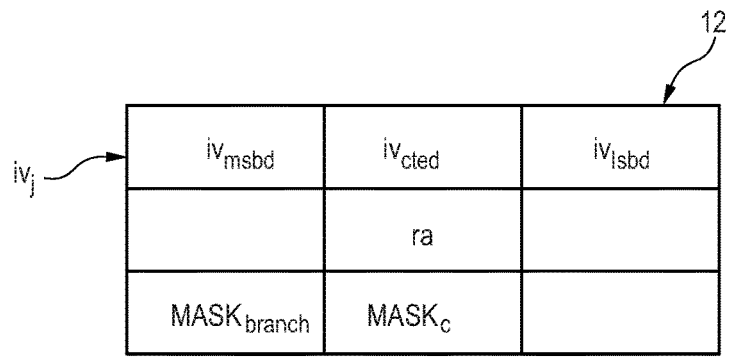
FIG. 6 is a schematic illustration of various registers of the electronic apparatus that are used when executing the secure function.

FIG. 6 shows the main registers described up until now. These registers may be registers of the set 12 and/or registers of the module 28. The registers of the module 28 are preferably used to record the information used for encryption or decryption. Thus, preferably, the registers $iv_{msbd}$, $iv_{cted}$, $iv_{lsbd}$, $MASK_{branch}$, $MASK_c$ are registers contained in the memory 29.

FIG. 7 shows a method for the execution of the binary code 30 by the microprocessor 2.

The method starts with a step 150 of generating and then providing the binary code 30 in the memory 4. The binary code 30 is typically generated by a compiler, such as the one described with reference to FIG. 11. Providing the binary code 30 here then consists in providing the copy 40 and then, for example, the microprocessor 2 copies the copy 40 to within the memory 4 in order to obtain the binary code 30 recorded in the memory 4.

Next, in a phase 152, the microprocessor 2 executes the binary code 30 and, in particular, the machine code 32.

The execution of the binary code 30 possibly begins with a step 154 of authenticating the author of this binary code. If the entire authentication has been completed successfully, then the method continues with a step 162. By contrast, if the authentication was not completed successfully, the module 28 then considers that the authentication of the author of the binary code 30 has failed and the method continues with a step 163. In step 163, the execution of the binary code 30 is stopped.

In step 162, the module 28 loads the cryptograms ka* and $MASK_c{}^*$, $iv_{msbd}{}^*$, $iv_{cted}{}^*$ contained in the block 34 and decrypts them using the key $sk_{CPU}$ contained in the memory 29. The module 28 initializes the values contained in the registers $MASK_c$, $iv_{msbd}$, $iv_{cted}$ from the decrypted masks $MASK_c{}^*$, $iv_{msbd}{}^*$, $iv_{cted}{}^*$, respectively. At the end of step 162, the key ka and the mask $M_k$ used to decrypt the first basic block of the machine code 32 are contained in the memory 29.

After step 162, the microprocessor 2 executes the basic blocks one after another, starting with the first basic block $BB_1$ of the machine code 32.

Executing each basic block consists in executing, in the order in which the instruction lines $LI_j$ of this basic block are recorded in the memory 4, the instructions coded by each of these instruction lines.

For each of the instruction lines $LI_j$ to be executed, the microprocessor 2 executes the following steps.

In a step 164, the microprocessor 2 loads the instruction line $LI_j$ recorded at the address $@_j$ contained in the ordinal counter 26 to a register of the set 12.

Next, the module 28 moves to a step 166 of securing the instruction coded in the loaded instruction line.

The operation of step 166 is now described in the case of the line $LI_j$. More precisely, in step 166, the module 28 performs the following operations in succession.

In an operation 170, the module 28 verifies whether there is an error in the cryptogram $CI_j{}^*$ or the code $MAC_j$ using the code $ECC_{Lj}$ contained in the loaded line $LI_j$. For example, for this purpose, the module 28 uses a pre-programmed function and the cryptogram $CI_j{}^*$ and the code $MAC_j$ to construct a code $ECC_{Lj}{}'$. If the code $ECC_{Lj}{}'$ is different from the code $ECC_{Lj}$, then an error is detected. If an error is detected, the module 28 moves immediately to a step 172.

In step 172, the module 28 triggers signaling of an execution fault.

In this case, in parallel with step 172, if an error is detected, the module 28 moves to an operation 174. In operation 174, it corrects the cryptogram $CI_j{}^*$ and the code $MAC_j$ based on the information contained in the code $ECC_{Lj}$. At the end of step 174, the corrected cryptogram $CI_j{}^*$ and the corrected code $MAC_j$ are used instead of the cryptogram $CI_j{}^*$ and the code $MAC_j$ contained in the line $LI_j$, respectively.

Operation 170 makes it possible notably to detect and to correct faults inserted into the instruction lines stored in the memory 4.

At the end of operation 174, or if no error has been detected in operation 170, the method continues with an operation 176.

In operation 176, the module 28 verifies the integrity and the authenticity of the cryptogram $CI_j{}^*$ using the code $MAC_j$. For example, for this purpose, the module 28 constructs a tag of the cryptogram $CI_j{}^*$ and then encrypts this tag with the key k' contained in its memory 29. If the cryptogram thus constructed is identical to the loaded code $MAC_j$, then the integrity and the authenticity of the cryptogram $CI_j{}^*$ is confirmed. In this case, the module 28 moves to an operation 178. In the opposite case, the module 28 moves to step 172.

Operation 176 makes it possible firstly to confirm the authenticity of the loaded line of code and also to confirm that, in operation 174, the cryptogram $CI_j{}^*$ and/or the code $MAC_j$ have been corrected correctly. Verifying the authenticity prevents the line of code being replaced by another line of code constructed by an author who does not know the key k'.

In operation 178, the module 28 decrypts the cryptogram $CI_j{}^*$ using the key ka, the initialization vector $iv_j$ and the function $f_{ka}{}^{-1}$ in order to obtain the decrypted concatenation $CI_j$. It is recalled that this concatenation $CI_j$ contains the decrypted masked instruction $I_j{}^M$ and code $ECC_{ijM}$. The key ka was recorded in the memory 29 in step 162. In operation 178, the vector $iv_{lsbd}$ is calculated by the module 28 using the relationship: $iv_{lsbd}=F_{iv}(@_j)$, where $@_j$ is the address from which the line $LI_j$ was loaded in step 164. Next, the vector $iv_j$ used to decrypt the cryptogram $CI_j{}^*$ is the result of the concatenation of the calculated vector $iv_{lsbd}$ and of the vectors $iv_{msbd}$ and $iv_{cted}$ initialized in step 162.

Next, in an operation 180, the module 28 verifies whether there is an error in the masked instruction $I_j{}^M$ using the code $ECC_{ijM}$ obtained in operation 178. This operation is performed in a manner similar to what was described for operation 170. This operation 180 makes it possible to verify that the loaded line was actually constructed from the vector $iv_j$ corresponding to the address $@_j$.

If the module 28 detects an error, then it moves immediately to step 172. In addition, in parallel, in an operation 182, the module 28 corrects the masked instruction $I_j{}^M$ using the code $ECC_{ijM}$. Operation 182 is similar to operation 174.

Next, at the end of operation 182, or if no error has been detected in operation 180, the method continues with an operation 184.

In operation 184, the module 28 decrypts the masked instruction $I_j^M$ that is obtained. For this purpose, it obtains the derived mask $M_j$ from the mask $M_k$ currently recorded in the register $MASK_c$. The register $MASK_c$ contains the mask loaded during the execution of the basic block preceding the one that contains this line $LI_j$ currently being processed. If the line $LI_j$ is contained in the first basic block $BB_1$ of the machine code 32, it is the initial values of the registers $MASK_c$ that are used.

In this case, it is the execution of the branch instruction "Branch @xx" or "BranchIV rd" or "BranchIV ra" by the unit 10 that indicates to the module 28 that it should replace the content of the register $MASK_c$ with the content of the register $MASK_{branch}$. The content of the register $MASK_{branch}$ is updated when the instruction "Load $M_{xx}$" or "LoadIV rd" or "LoadIV ra" that precedes the branch instruction is executed.

The derived mask $M_j$ is derived from the mask $M_{j-1}$ using the pre-programmed function $F_e$. In this case, the mask $M_j$ is obtained using the following relationship: $M_j = F_e(M_{j-1})$, where $M_{j-1}$ is the derived mask obtained when decrypting the previous instruction $I_{j-1}$ of the same basic block $BB_k$. The function $F_e$ is a function that modifies the previous derived mask $M_{j-1}$ in a predetermined way, such that the mask $M_j$ that is obtained is different from the mask $M_{j-1}$ and, generally, different from all of the derived masks that are obtained for the previous instruction lines of this same basic block $BB_k$. Numerous functions $F_e$ are possible. For example, the function $F_e$ is chosen from the group formed of the following functions and of their composition:

$F_{e1}$: a swap function,
$F_{e2}$: a linear feedback shift register or LFSR,
$F_{e3}$: a stream cipher or block cipher,
$F_{e4}$: a bit-by-bit combination between the bits of the mask $M_k$ and bits liable to vary upon each execution of a previous instruction of the block $BB_k$.

As an example of the function $F_{e4}$, mention may be made of the following function $M_j = M_k$ XOR $I_{j-1}$ or else the combination of the bits of the mask $M_k$ with check bits updated when the instruction $I_{j-1}$ is executed and different from the bits of the instruction $I_{j-1}$. As an example of check bits, mention may be made of the bit that indicates to the unit 10 the presence of a deduction or the one that indicates to the unit 10 whether or not the item of data processed during the execution of the instruction $I_{j-1}$ is a signed item of data.

In this case, the function $F_e$ is the function $F_{e1}$.

When the instruction $I_j$ is the instruction contained in the first instruction line of the basic block, the value of the mask $M_j$ is initialized based on the value of the mask $M_k$. For example, in this case, the mask $M_j$ is taken to be equal to $F_e(M_k)$ or to $M_k$. Thus, all of the derived masks used to decrypt the instructions of the block $BB_k$ are derived from the mask $M_k$. Therefore, if the mask loaded to the register $MASK_c$ is not the one associated with the block $BB_k$, the instructions of the block $BB_k$ are not decrypted correctly. The instructions of the block $BB_k$ are also not decrypted correctly if an attack leads to the middle of the block $BB_k$ being jumped to directly. In this case, the calculated derived mask $M_j$ does not allow the instruction $I_j^M$ to be decrypted correctly, since the function $F_e$ has not been executed for the previous instruction lines.

Once the derived mask $M_j$ has been obtained, the masked instruction $I_j^M$ is in this case decrypted using the following relationship: $I_j = I_j^M$ XOR $M_j$.

At the end of operation 184, the module 28 records the decrypted instruction $I_j$ in the queue 22.

Once the unit 10 has executed all of the instructions preceding the instruction $I_j$ in the queue 22, that is to say when the instruction $I_j$ is the next instruction to be executed by the unit 10, in a step 190, the unit 10 executes the instruction $I_j$.

As shown in FIG. 7, in parallel with step 190, the method comprises a step 198 of securing the processed data. This step 198 is described in more detail in the following section.

Encrypting the concatenation $CI_j$ using the initialization vector $iv_j$ that depends on the address $@_j$ makes it possible to detect whether the line $LI_j$ has been moved in the memory 4 without this being performed by the microprocessor 10. For example, if two lines $LI_1$ and $LI_2$ are swapped, such swapping of the lines $LI_1$ and $LI_2$ is not necessarily detected in operation 170 or 176. By contrast, since the concatenation $CI_1$ is encrypted with an initialization vector $iv_1$ that depends on the address $@_1$, if the line $LI_1$ is moved and is situated at an address $@_2$ in the memory 4, when this line is loaded from this address $@_2$, the cryptogram $CD_1^*$ will be decrypted using the vector $iv_2$ and not using the vector $iv_1$. Such incorrect decryption of the concatenation $CI_1$ is then detected in operation 180. Operation 180 thus makes it possible to verify that the line $LI_1$ was actually constructed from the vector $iv_1$.

Operation 184 makes it possible to trigger an execution fault if the control flow of the machine code 32 has been modified. Specifically, a modification of the control flow is reflected in the fact that, after execution of the basic block $BB_{k-1}$, it is not the basic block $BB_k$ that is executed, but another basic block $BB_t$. In this case, when the block $BB_{k-1}$ is executed, the mask $M_k$ is loaded to the register $MASK_{branch}$. Therefore, when the block $BB_t$ is executed, the masked instruction $I_j^M$ is decrypted using the mask $M_k$ associated with the block $BB_k$ and not using the mask $M_t$ associated with the block $BB_t$. As a result, decrypting the masked instruction $I_j^M$ using the mask $M_k$ leads to an incorrect instruction $I_j$ being obtained. This incorrect instruction $I_j$ typically has more than one chance in two or more than one chance in four of not belonging to the set of predefined instructions of the unit 10. When the instruction to be executed by the unit 10 does not belong to its set of instructions, this triggers an execution fault. For example, in this case, the method continues with step 172 and/or this causes the sudden stoppage of the execution of the machine code 30. Operation 184 thus makes it possible to make the machine code more robust against attacks aimed at modifying the control flow. These attacks typically disrupt the execution of the operation "Branch @XX" or "BranchIV ra" or "BranchIV rd".

Operation 184 also makes it possible to detect swapping, in the memory 4, of the two basic blocks $BB_k$ and $BB_t$ of the second type. Specifically, if the block $BB_k$ is replaced with the block $BB_t$, then, when the instruction "LoadIV ra" of the block $BB_{k-1}$ is executed, the first data line of the block $BB_t$ is decrypted using a vector $iv_j$ constructed from the address $@_k$ and not from the address $@_t$. This therefore leads to incorrect decryption of the cryptogram $M_k^*$ and therefore to incorrect decryption of the first instruction line of the block $BB_t$.

When the machine code 32 is executed, if attacks lead to an instruction to be protected being altered or to the control flow being modified, the microprocessor 2 signals a fault in the execution of the machine code 32 in step 172. In response to such signaling, in a step 192, the microprocessor 2 implements one or more countermeasures. A very large number of countermeasures are possible. The countermeasures that are implemented may have very different degrees of severity. For example, the countermeasures that are implemented may range from simply displaying or simply storing an error message without interrupting the normal execution of the machine code 32 as far as definitively taking the microprocessor 2 out of service. The microprocessor 2 is considered to be out of service when it is definitively put into a state in which it is incapable of executing any machine code. Between these extreme degrees of severity, there are numerous other possible countermeasures, such as:

indicating the detection of the faults by way of a human-machine interface, immediately interrupting the execution of the machine code 32 and/or reinitializing it, and deleting the machine code 32 from the memory 4 and/or deleting the backup copy 40 and/or deleting the secret data.

In addition, in this case, the countermeasure implemented in step 192 may be selected depending on the detected error and therefore depending on the operation that led to the detection of this fault. For example, the selected countermeasure will not be the same depending on whether the error was detected in operation 176 or 180.

Section IV: Securing The Data:

Data $D_j$ processed when the machine code 32 is executed are recorded in the memory 4. For example, the binary code 30, in addition to the machine code 32, may contain data to be processed when the machine code 32 is executed. In addition, when the machine code 32 is executed, this may generate data. These data are typically contained in the part 44 of the memory 4.

Likewise, each time a calling function triggers the execution of a called function, the execution context of the calling function is saved to the stack 46. The called function also saves data such as local variables to the stack 46.

In a manner similar to what was described in the case of the instructions $I_j$ an item of data $D_j$ recorded in the part 44 or in the stack 46 may be corrupted by implementing attacks, such as for example a fault injection attack.

In order to protect the data against such attacks, each item of data $D_j$ recorded in the memory 4 is in this case coded in a respective line $LD_j$. The line $LD_j$ is a data line. Unlike the instruction lines $LI_j$ described in section III, the line $LD_j$ codes an item of data $D_j$ to be processed by the microprocessor and not an instruction $I_j$ able to be executed by the unit 10.

The structure of a line $LD_j$ is shown in FIG. 8. In this case, the structure of the line $LD_j$ is identical to the structure of the line $LI_j$, except that the cryptogram $CI_j^*$ is replaced with a cryptogram $CD_j^*$. Given that the codes $MAC_j$ and $ECC_{Lj}$ of the line $LD_j$ are calculated as already described in the case of the lines $LI_j$, they are denoted here using the same symbols and are not described again.

The cryptogram $CD_j^*$ is obtained by encrypting a concatenation $CD_j$ with the function $f_{ka}$. The function $f_{ka}$ is the same as the one already described in the case of the lines $LI_j$. The cryptogram $CD_j^*$ is thus obtained using the following relationship: $CD_j^* = f_{ka}(CD_j; iv_j)$. The function $f_{ka}$ is pre-programmed in the module 28.

The vector $iv_j$ is constructed in the way as what was described above for the instruction lines. To this end, the module 28 uses the function $F_{iv}$ described above. The following relationship is therefore always used: $iv_{lsbd} = F_{iv}(\%)$, where $@_j$ is the address where the item of data $D_j$ is recorded in the memory 4.

The concatenation $CD_j$ is the concatenation of the item of data $D_j$ and of a code $ECC_{Dj}$. The code $ECC_{Dj}$ makes it possible to detect and to correct an error in the item of data $D_j$. It is constructed as described for the code $ECC_{Ij}$, except that the masked instruction $I_j^M$ is replaced with the item of data $D_j$. In this case, the item of data $D_j$ is not masked or encrypted before being inserted into the concatenation $CD_j$.

Figure 9:
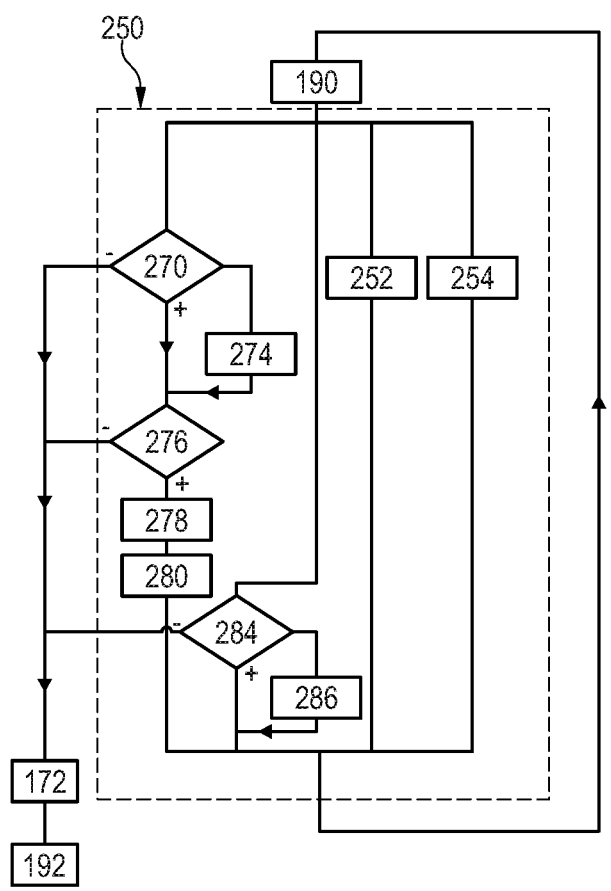
FIG. 9 is a flowchart of a detail of a step of the method of FIG. 7 implemented in order to secure the data recorded in a main memory of the apparatus of FIG. 1.

The securing of the data $D_j$ saved in the memory 4 will now be described in more detail with reference to the method of FIG. 9 and in the specific case in which it is implemented in combination with the teaching in the other sections. More precisely, the data $D_j$ are secured each time the instruction executed in step 190 is an instruction to read or write an item of data $D_j$ from or to the memory 4. The method of FIG. 9 shows the operations that are executed in step 198 in order to secure the data $D_j$.

Each time the unit 10, in step 190, executes an instruction that leads to a new item of data $D_j$ being recorded in a register, denoted $R_j$ here, of the set 12, the module 28 constructs the concatenation $CD_j$ and records it in the register $R_j$ in an operation 252. In this case, for this purpose, the module 28 executes the same algorithm $C_d$ as the one executed in order to construct the concatenation $CI_j$. This execution of the algorithm $C_d$ performs the following function: $CD_j = C_d(D_j)$.

Subsequently, in a new execution of step 190, the unit 10 executes an instruction to record the item of data $D_j$ contained in the register $R_j$ at the address $@_j$ of the stack 46.

In response, in an operation 254, the module 28 constructs the data line $LD_j$ that has to be recorded at the address $@_j$. For this purpose, it executes the same algorithm $F_c$ as the one used to construct a line $LI_j$. During this execution, it performs the following function: $LD_j = F_c(CD_j, @_j)$. Executing the algorithm $F_c$ drives the module 28 notably to perform the following operations:

updating the content of the register $iV_{lsbd}$ using the relationship $iv_{lsbd} = F_{iv}(@_j)$, and then encrypting the concatenation $CD_j$ of the item of data $D_j$ and of the code $ECC_{Dj}$ using the function $f_{ka}$ and the initialization vector $iv_j$, using the following relationship: $CD_j^* = f_{ka}(CD_j; iv_j)$, and then calculating the code $MAC_j$ from the cryptogram $CD_j^*$, and then calculating the code $ECC_{Lj}$ from the cryptogram $CD_j^*$ and from the calculated code $MAC_j$.

Next, at the end of operation 254, the constructed line $LD_j$ is transferred and recorded in the memory 4 at the address $@_j$.

If the next instruction to be executed in step 190 is an instruction to load a line $LD_j$, then the unit 10 executes this instruction and the line $LD_j$ is loaded to a register of the microprocessor 2. This load instruction typically contains an operand that indicates the address $@_j$ where the line $LD_j$ to be loaded is located. In this case, when the unit 10 executes this load instruction, it loads the line $LD_j$ to a register $R_j$ of the set 12 for example.

Next, the module 28 executes operations 270, 274, 276 and 278 identical to operations 170, 174, 176 and 178, respectively, of the method of FIG. 7, except that it is the corresponding codes contained in the line $LD_j$ that are used and not those contained in a line $LI_j$.

Once the cryptogram $CD_j^*$ has been decrypted, in an operation 280, the module 28 records the decrypted item of data $D_j$ and the decrypted code $ECC_{Dj}$ in the register $R_j$, waiting for this item of data to be processed by the unit 10.

When the next instruction that will be executed by the unit 10 is an instruction that processes the item of data $D_j$, the module 28 moves to operations 284 and 286. The module 28 identifies that the next instruction to be executed will process the item of data $D_j$, since this instruction generally contains an operand that identifies the register $R_j$ in which the item of data $D_j$ is recorded. Operations 284 and 286 are identical, respectively, to operations 180 and 182 of the method of FIG. 7, except that it is the item of data $D_j$ and the code $ECC_{D_j}$ that are used and not the masked instruction $I_j^M$ and the code $ECC_{I_jM}$.

Next, at the end of operation 286, or if no error was detected in operation 284, the unit 10 executes the instruction that processes the item of data $D_j$.

The method for securing data described here furthermore has the same advantages as those presented in section III, in particular due to the fact that the structure of the line $LD_j'$ is identical to that of the line $LI_j$.

Section V: Rearrangement of the Main Memory

Figure 10:
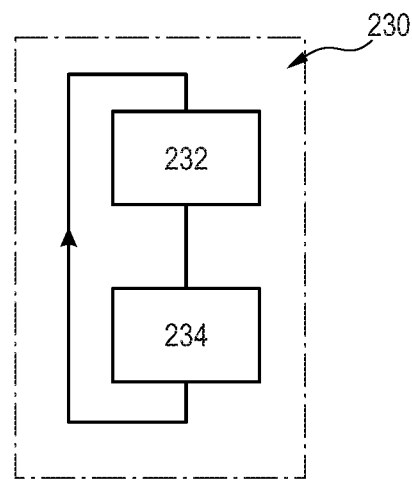
FIG. 10 is a flowchart of a phase of rearranging a main memory.

In general, the microprocessor 2 executes an operating system that furthermore optimizes use of the memory 4 from time to time. To this end, it performs a phase 230 (FIG. 10) of rearranging the lines of the memory 4. This phase 230 will now be described in more detail with reference to the method of FIG. 10.

Phase 230 is typically executed in parallel with the execution of the other programs currently being executed and, for example, during the execution of the machine code 32. In this phase 230, lines recorded in the memory 4 are moved from a first address to a different second address. Typically, in the context in which a paging virtual memory mechanism is implemented, the lines are moved by a whole page. It is recalled that, when a virtual memory mechanism is implemented, there is a table, known by the name "page table", that associates a physical address in the memory 4 with each virtual address of the memory space of a program currently being executed. Each virtual address thus corresponds to a physical address and vice versa. There is also a module, known by the acronym MMU ("memory management unit"), that is responsible for managing and in particular for automatically updating the page table as soon as lines are moved, so as to maintain the match between the virtual addresses and the physical addresses.

In these operations of moving lines of the memory 4, all of the lines that are moved are processed in the same way. More precisely, all of the lines that are moved are processed as if they were data lines. Thus, in phase 230, if instruction lines need to be moved, these are read and written by implementing the method of FIG. 9. In other words, each instruction line is loaded in response to the unit 10 executing a load instruction, and not because the address contained in the ordinal counter 26 corresponds to this instruction line. Therefore, loading an instruction line in phase 230 does not trigger the execution of the instruction loaded by the unit 10. Therefore, hereinafter, the steps implemented in order to move a line of the memory 4 are described using the notations introduced for the data lines. However, these steps apply equally to the case of a data line and an instruction line. In the case of an instruction line, the masked instruction $I_j^M$ is processed as if it were an item of data.

The steps of phase 230 are described below in the specific case of moving an item of data DI from an address $@_1$ to an address $@_2$. However, what is described in this specific case applies to all of the lines that are moved during phase 230.

In a step 232, an instruction to load the line $LD_1$ recorded at the address $@_1$ is executed by the unit 10. This load instruction is an instruction to load an item of data. It is therefore executed as described with reference to the method of FIG. 9. On this occasion, operations 270, 276, 278, 280 and possibly operation 274 are first of all executed in order to record the item of data DI and its code $ECC_{D1}$ in a register $R_1$ of the set 12.

Next, in a step 234, an instruction to record the item of data DI at the address $@_2$ is executed by the unit 10. This then triggers, in succession:

the execution of operation 284 of verifying the code $ECC_{D1}$ and, possibly, operation 286 of correcting the item of data DI using the code $ECC_{D1}$, and then the execution of operation 254 of constructing and recording a new line $LD_2$ containing the cryptogram of the item of data DI obtained from the address $@_2$.

In the absence of an attack and during normal operation, steps 232 and 234 may be applied to the instruction lines without this automatically triggering signaling of an execution fault. Specifically, except for the fact that, in the specific case of an instruction line, the item of data is the masked instruction $I_j^M$, the instruction and data lines are constructed in the same way.

Section VI: Generation of the Binary Code

Figure 11:
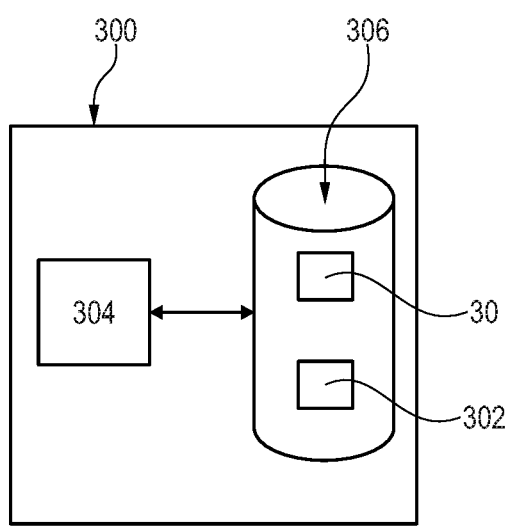
FIG. 11 is a schematic illustration of a compiler able to generate the binary code executed by the apparatus of FIG. 1.

FIG. 11 shows a compiler 300 able to automatically generate the binary code 30 from a source code 302. To this end, the compiler 300 typically has a programmable microprocessor 304 and a memory 306. The memory 306 contains the instructions and the data necessary for automatically generating the binary code 30 from the source code 302 when they are executed by the microprocessor 304. In particular, when the source code 302 is compiled, the microprocessor 304 automatically generates the appropriate masks $M_k$ and the lines of code $LI_j$ and $LD_j$. During this compilation, the compiler 300 also automatically inserts the instructions described above for implementing the methods of FIGS. 7 and 9 into the machine code. The design and the implementation of such a compiler are within the scope of a person skilled in the art based on the explanations given in this description. For example, for this purpose, the compiler 30 automatically locates and identifies the branch instructions and, depending on the identified branch instruction, automatically inserts the instructions required to implement the methods described here before and/or after it.

Section VII: Variants:

Variants of the Apparatus 1:

Other embodiments of the apparatus 1 are possible. In particular, all of the variants described in paragraphs 191 to 194 of application EP3457620A1 are applicable here.

In another embodiment, the module 28 is replaced with a software module that, when it is executed by the unit 10, performs the same functions and operations as those described for the module 28.

Variants of Securing the Machine Code:

As a variant, the use of the derived mask $M_1$ instead of the mask $M_k$ is omitted. In this case, each masked instruction $I_j^M$ is obtained directly and solely from the mask $M_k$. For example, the masked instruction $I_j^M$ is obtained using the following relationship: $I_j^M=I_j$ XOR $M_k$. The evolution function $F_e$ may thus be omitted in this embodiment since it is no longer used.

Numerous embodiments are possible for constructing the masked instruction $I_j^M$ from the instruction $I_j$ and from the derived mask $M_j$. For example, an encryption function may be used for this purpose. In this case, the masked instruction $I_j^M$ is obtained using the following relationship: $I_j^M=F_m(I_j, M_j)$, where $F_m$ is an encryption function corresponding to a function $F_m^{-1}$ that is pre-programmed in the module 28 and makes it possible to decrypt the masked instruction $I_j^M$. For example, the function $F_m$ is identical to the function $F_{ka}$ or to the function $F_{iv}$. In another variant, the function $F_m$ is a pseudo-random generator initialized with the value of the mask $M_k$ at the start of the execution of the block $BB_k$. In this case, each time the function $F_m$ is executed, it generates a new mask $M_j$ different from the previous one.

In another embodiment, only the structure of the second type described with reference to FIG. 5 is used for all of the basic blocks of the machine code 32. In this case, what was described above in the specific case of indirect branches is also implemented for direct branches.

Other embodiments of the content of the first line of a block $BB_k$ of the second type are possible. For example, this content is not necessarily encrypted. In another variant, this content is encrypted using a key other than the address $@_k$ of the first line. For example, the content of the first line is only encrypted with the key ka. The content of the first line may also contain a cryptogram a $@_{lsbi}*$ of an address $@_{lsbi}$ instead of the cryptogram $M_k*$. In this case, when the instruction "LoadIV ra" or "LoadIV rd" is executed, it causes the cryptogram a $@_{lsbi}*$ to be read and decrypted in order to obtain the address $@_{lsbi}$. Next, the content from which the 32 bits of the mask $M_k$ are constructed is read from the address $@_{lsbi}$.

Other embodiments are possible in order to obtain the mask $M_k$ from the address $@_k$. For example, an association table is loaded to the memory 29 before or at the start of the execution of the code 32. This table associates the content for constructing the 32 bits of the mask $M_k$ with each address $@_k$ of a block $BB_k$ of the second type. For example, this content is identical to that described in the case in which it is recorded in the first line of the basic block of the second type. The operation of this embodiment is identical to that described above, except that the instruction "LoadIV ra" or "LoadIV rd", when it is executed by the microprocessor 2, causes the mask $M_k$ to be obtained from the content of the association table and not from the content of the first line of the basic block $BB_k$. In this case, the basic blocks of the second type are replaced with basic blocks of the first type, and the instruction "BranchIV rd" or "Branch IV ra" is modified so as to cause a jump to the first line of the following basic block and not to the second line of this basic block.

As a variant, some functions or portions of the binary code 30 are not secure. In this case, such a binary code is executed for example as described in paragraphs 195 to 197 of application EP3457620A1.

Variants Common to Securing the Machine Code and the Data:

In this section, all of the described variants apply equally to an instruction line and to a data line. In the remainder of this chapter, these variants are described using the notations defined for a data line. The opposite choice could however have been made.

It is not necessary to construct the vector $iv_j$ using the content of the registers $iv_{msbd}$ and $iv_{cted}$. For example, as a variant, the content of the registers $iv_{msbd}$ and $iv_{cted}$ is constructed from the content of the register $iv_{lsbd}$. For example, the vector $iv_j$ coded on 128 bits is obtained by concatenating the 32 bits of the register $iv_{lsbd}$ four times with themselves. In this case, the registers $iv_{msbd}$ and $iv_{cted}$ may be omitted.

The various variants described in the chapter "Variants of securing the data" in application EP3457620A1 are applicable in the context of the present application. In particular, the code $ECC_{Dj}$ may be replaced with a simple error detection code only for detecting an error in the item of data $D_j$ with which it is concatenated. An error detection code does not make it possible to correct the detected error. In this case, error correction operations 182 and 286 are omitted.

In one simplified variant, the code $ECC_{Dj}$ is omitted. In this embodiment, the microprocessor 2 is no longer capable of detecting an error in the decryption of the cryptogram $CD_j*$ or a modification of the item of data $D_j$ that occurs after it has been decrypted and before it is used by the unit 10. In this case, operations 180, 182, 284 and 286 are omitted.

The code $ECC_{Lj}$ may be replaced with a simple error detection code. In this case, correction operations 174 and 274 are omitted.

In another variant, the code $ECC_{Lj}$ is constructed so as to allow the detection of only one error, that is to say either only in the cryptogram $CD_j*$ or only in the code $MAC_j$.

The code $ECC_{Lj}$ may be omitted. In this case, an error in the cryptogram $CD_j*$ or in the code $MAC_j$ is able to be detected only during the execution of operation 176, 276 of verifying the integrity and the authenticity of the cryptogram. Detecting an error using a MAC code is generally more complex than using a simple error detection code or a simple error correction code. In addition, when the code $ECC_{Lj}$ is omitted, if there is an error in the cryptogram $CI_j*$ or the code $MAC_j$, it is not possible to correct this error. In the latter case, for example, the execution of the function is thus interrupted automatically in the event of an error.

In another embodiment, it is the code $MAC_j$ that is omitted. Operation 176, 276 is then also omitted.

As a variant, the function $F_{iv}$ is identical to the function $f_{ka}$ except that it is applied to the address $@_j$. The function $F_{iv}$ may also use the same encryption algorithm as the function $f_{ka}$ but with an encryption key different from the key ka.

In one simplified variant, the function $F_{iv}$ is the identity function. In this case, the content of the register $iv_{lsbd}$ is automatically equal to the address $@_j$.

In the embodiments described up until now, both the item of data $D_j$ and the code $ECC_{Dj}$ are encrypted as a function of the vector $iv_j$. As a variant, either only the item of data $D_j$ or only the code $ECC_{Dj}$ is encrypted as a function of the vector $iv_j$. For example, in the data line, the cryptogram of the item of data $D_j$ is obtained from an encryption function that does not use the vector $iv_j$, whereas the cryptogram $ECC_{Dj}*$ of the code $ECC_{Dj}$ is obtained using the encryption function $f_{ka}$ ($ECC_{Dj}$; $iv_j$). In this case, in operation 278, the module 28 decrypts the cryptogram of the item of data $D_j$ without using the vector $iv_j$ and decrypts the cryptogram $ECC_{Dj}*$ using this vector $iv_j$. After that, the rest of the method is identical to what has already been described. In one simplified embodiment, since the item of data $D_j$ does not need to be encrypted as a function of the vector $iv_j$, it is also possible not to encrypt it. For example, the line of code then contains the item of data $D_j$ in open form and the cryptogram $ECC_{Dj}*$. Therefore, in operation 278, the decryption of the item of data $D_j$ is omitted since it is enough to extract it from the bit range in which it is contained in the line $LD_j$.

On the other hand, it is also possible to modify the structure of the lines $LD_j$ such that only the item of data $D_j$ is encrypted as a function of the vector $iv_j$. For example, the line $LD_j$ contains a cryptogram $D_j*$ of the item of data $D_j$ obtained by encrypting it using the function $f_{ka}(D_j; iv_j)$ and a cryptogram $ECC_{Dj}*$ obtained by encrypting the code $ECC_{Dj}$ using an encryption function independent of the vector $iv_j$. In operation 278, the module 28 decrypts the cryptogram $D_j*$ using the vector $iv_j$ and decrypts the cryptogram $ECC_{Dj}*$ without using this vector $iv_j$.

As a variant, operation 176 or 276 continues automatically with operation 178 or 278, even if the integrity or the authenticity of the cryptogram has not been able to be confirmed. In this case, operation 176 or 276 serves to trigger signaling of an execution fault without interrupting the execution of the binary code.

Starting from the time when a line of code contains at least one of the elements from the group formed of a message authentication code, an error correction code and an error detection code, it is possible to detect modification of the content of this line. Thus, just one of any of the elements in this group is necessary to detect modification of the content of an instruction line or of a data line.

Numerous embodiments of the function $f_{ka}$ are possible. For example, the function $f_{ka}$ may be as simple as a single "Exclusive OR" logic operation between the item of data $D_j$ and the vector $iv_j$ or between the code $ECC_{Dj}$, and the vector $iv_j$.

The encryption and the decryption have been described in the specific case in which the functions $f_{ka}$ and $f_{ka}^{-1}$ are encryption algorithms that use an "initialization vector" and preferably also a secret key ka. However, the functions $f_{ka}$ and $f_{ka}^{-1}$ may also be encryption/decryption algorithms in which an initialization vector is not necessary. However, everything that has been described here applies in the same way to such an encryption/decryption algorithm by simply replacing the term "initialization vector" with the term "key".

In another variant, the keys ka and k' are the same.

Variants Common to the Various Sections Above

What has been described here also applies in a context in which no virtual memory mechanism is implemented. In this case, no virtual address is used, and only the physical addresses are used.

The key ka may be pre-recorded in the memory 29. In this case, the cryptogram ka* may be omitted from the block 34.

The cryptogram k'* of the key k' encrypted with the public key $pk_{CPU}$ may be recorded in the block 34. In this case, the key k' does not need to be pre-recorded in the memory 29.

A line of code may be longer than a data word. In this case, each line of code is formed of several data words that are generally situated at immediately consecutive memory addresses in the memory 4. In this case, a line of code is loaded to the microprocessor 2 not in one single read operation, but by executing several read operations. Each read operation loads a respective data word of the line of code to the microprocessor.

Depending on the set of instructions used by the microprocessor 2, the described instructions, such as "LoadIV", "BranchIV", each correspond to a single instruction of this set or, by contrast, to a group of several instructions of this set.

All of the embodiments described in this text and, in particular, the various variants, may be combined with one another.

The use of the function $F_e$ to obtain a derived mask $M_j$ from the mask $M_k$ may be implemented independently of the fact that the instruction and data lines are constructed in the same way. For example, the use of the function $F_e$ may be implemented in the embodiments of application EP3457620A1 in order to obtain an initialization vector derived from the initialization vector $iv_k$ associated with the block $BB_k$ for each instruction of this block $BB_k$. Next, each instruction of the block $BB_k$ is decrypted using the derived initialization vector obtained for the instruction line containing this instruction instead of directly using the vector $iv_k$ associated with this block $BB_k$.

Section IX: Advantages of the Described Embodiments

Since loading of the mask $M_k$ required to decrypt the instruction lines of the basic block $BB_k$ is triggered when the basic block $BB_{k-1}$ is executed, the method is more robust against attempts to bypass the control flow. Specifically, if, following the execution of the basic block $BB_{k-1}$, it is a basic block $BB_t$ that is executed instead of the basic block $BB_k$, then the instruction lines of the block $BB_t$ are decrypted using the loaded mask $M_k$. The instruction lines of the block $BB_t$ are therefore not decrypted using the mask $M_t$ associated with this block $BB_t$. Thus, the decryption of the instruction lines of the block $BB_t$ is incorrect, thereby triggering an execution fault. It is therefore difficult to bypass the execution flow from the block $BB_k$ to the block $BB_t$.

In addition, since the instruction lines are constructed in the same way as the data lines, these may be loaded in the same way as data lines without this automatically causing signaling of an execution fault to be triggered. It is therefore possible to move the instruction lines in the rearrangement phase 230.

Lastly, if an instruction line is moved in the main memory without this movement being executed by the microprocessor 2, this also causes signaling of an execution fault.

The phase of rearranging the main memory makes it possible to optimize the operation of the main memory and also for example to free up space in the main memory in order to launch the execution of an additional program in parallel with the execution of the machine code 32.

Verifying, in operation 180, that the loaded instruction line was actually constructed using the initialization vector $iv_j$ associated, by the function $F_{iv}$, with the address $@_j$ designated by the ordinal counter makes it possible to ensure than an instruction line has not been moved without having processed this instruction line in the same way as a data line.

Using the evolution function $F_e$ makes it possible to obtain a mask $M_j$ different from the mask $M_{j-1}$ that is used to decrypt the previous instruction, even if the previous instruction is situated inside the same basic block $BB_k$. By virtue of this, if an attacker manages to cause a branch not at the start of the block $BB_k$ but on a line $LI_j$ situated in the middle of the block $BB_k$, then the instruction contained in this line $LI_j$ cannot be decrypted correctly. Specifically, in this case, the function $F_e$ has not been executed for the previous instructions of this block $BB_k$. Therefore, when the function $F_e$ is executed for the first time for the line $LI_j$, the derived mask $M_j$ that is obtained is different from the one that would have been obtained if the function $F_e$ had been executed for each of the previous instruction lines of the block $BB_k$. The derived mask $M_j$ that is obtained is thus not correct, this being the case even if the mask $M_k$ from which the mask $M_j$ is constructed is correct. This makes it far more difficult to carry out attacks that bypass the control flow, not to another block $BB_t$, but to the correct block $BB_k$ but while jumping the first instruction lines of this block $BB_k$.

The indirect load instruction does not directly contain the value of the mask $M_k$, but only the identifier of a register intended to contain the address $@_k$ of the block $BB_k$. The basic block $BB_{k-1}$ thus contains only instructions that make it possible, at the time when this basic block $BB_{k-1}$ is executed, to construct this mask $M_k$ from the content of the identified register. Therefore, the basic block $BB_{k-1}$ is able to be compiled independently of the following basic block $BB_k$. By virtue of this, it is made possible to use an indirect branch at the end of a basic block, while at the same time retaining the possibility of controlling and guaranteeing the integrity of the control flow.

Recording the content to be loaded in order to construct the mask $M_k$ in the first line of the basic block $BB_k$ of the second type makes it possible to simply load this content to the microprocessor. In addition, it is easy to insert such a first data line when generating the machine code.

Encrypting the instructions $I_j$ makes it possible to guarantee confidentiality of the binary code 30, thereby making reverse engineering of the binary code very difficult. Verifying the integrity of the cryptogram $CI_j^*$ or $CD_j^*$ makes it possible to detect modifications to the binary code that are caused for example by attacks, such as fault injection into the memory 4. Verifying the authenticity of the instructions and the data makes it possible to detect the addition of additional instructions to the binary code 30 by an attacker in order for example to insert malicious software such as viruses into it, and to make this process very difficult. Specifically, even if the attacker knows the algorithm used to encrypt the instructions $I_j$ and the data $D_j$, he does not know the secret key k' used to construct the code $MAC_j$.

The fact that the code $ECC_{IjM}$, $ECC_{Ij}$ or $ECC_{Dj}$ is an error correction code and not just an error detection code makes it possible to make the execution method more robust against fault injection attacks. Specifically, in this case, the error correction code often makes it possible to correct the error inserted into the instruction $I_j$ or into the item of data $D_j$ such that the secure function continues to run correctly in spite of the presence of such errors.

Using the code $ECC_{Lj}$ makes it possible to detect an error in the cryptogram $CI_j^*$ or $CD_j^*$ or in the code $MAC_j$ more quickly than if only the code $MAC_j$ were used for this purpose. Using the code $ECC_{Lj}$ therefore makes it possible to speed up the execution of the binary code.

Using an error correction code for the code $ECC_{Lj}$ makes it possible to make the claimed method more robust against fault injection attacks into the memory 4 or into the medium 6. Specifically, in this case, the error correction code often makes it possible to correct the cryptogram $CI_j^*$ or $CD_j^*$ or the code $MAC_j$ such that the secure function runs correctly in spite of the presence of such errors.

The invention claimed is:

1. A method for execution of a binary code of a secure function by a microprocessor, said method comprising the following steps:
   a) providing the binary code, the binary code that is provided comprising a machine code containing a sequence of basic blocks, wherein:
      each of the basic blocks comprises a sequence of instruction lines each containing a cryptogram of an instruction, the instructions coded in these successive instruction lines being intended to be executed automatically by the microprocessor in the order in which they appear in said basic block,
      each of the basic blocks starts at a branch address and ends with an instruction line containing the cryptogram of a branch instruction to a branch address of another basic block, said other basic block being a following basic block and the basic block that ends with the instruction line containing the cryptogram of the branch instruction to said following basic block being a previous basic block,
      the cryptogram contained in each encrypted instruction line of a basic block depends on a mask associated with this basic block, said mask being different from the masks associated with the other basic blocks,
      the previous basic block contains an instruction line containing the cryptogram of an instruction to load the mask that, when it is executed by the microprocessor, causes loading, to the microprocessor, of the mask to be used to obtain an instruction from the cryptogram of each instruction line of the following basic block,
   b) execution of the binary code by the microprocessor, in said execution the method comprises:
      recording data in a main memory for each item of data to be recorded, the method comprising:
         executing an algorithm for constructing a data line containing the cryptogram of said item of data constructed using an initialization vector $iv_j$ associated with an address $@_j$ of the main memory using a relationship $iv_j = F_{iv}(@_j)$, where the function $F_{iv}$ is a pre-programmed function that associates a different initialization vector $iv_j$ with each different address $@_j$ of the main memory, and then
         recording said constructed data line in the main memory at the address $@_j$,
      execution, by a arithmetic and logic unit, of an instruction to load the data line, said load instruction containing an operand from which the address $@_j$ where the data line to be loaded from the main memory is recorded is obtained, followed by verifying that the loaded data line was actually constructed using the initialization vector $iv_j$ associated with said address $@_j$ by the function $F_{iv}$, and when said verification fails, triggering signaling of an execution fault and, when said verification succeeds, preventing said signaling of the execution fault,
      executing previous and following basic blocks, and when executing each instruction of the following basic block:
         loading, from the main memory, the instruction line designated by an ordinal counter of the microprocessor, followed by decrypting the cryptogram contained in the loaded instruction line using the mask loaded to the microprocessor when the previous basic block was executed, and then execution of the decrypted instruction by the arithmetic and logic unit of the microprocessor,
      wherein each instruction line of a basic block is constructed by executing a same construction algorithm as the one executed to construct the data line and using a same function $F_{iv}$, the item of data for said purpose being taken to be equal to the instruction masked using the mask associated with said basic block, such that loading said instruction line by executing an instruction to load a data line does not automatically trigger signaling of the execution fault.

2. The method as claimed in claim 1, wherein the method comprises a phase of rearranging the main memory wherein instruction lines are moved in the main memory, said phase of rearranging the main memory comprising, for each moved instruction line:
   execution, by the arithmetic and logic unit, of an instruction to load a data line wherein the address obtained from the operand is the address $@_{j1}$ of the instruction line to be moved, and then
   verifying, in the same way as for any loaded data line, that the instruction line thus loaded was actually constructed using the initialization vector $iv_{j1}$ associated, by the function $F_{iv}$, with the address $@_{j1}$ obtained from the operand of the load instruction, and when said verification fails, triggering signaling of the execution fault and, when said verification succeeds, preventing said signaling of the execution fault.

3. The method as claimed in claim 1, wherein, in step b), the loading of the instruction line designated by the ordinal counter of the microprocessor is also followed automatically by verifying, in the same way as for the data line, that the loaded instruction line was actually constructed using the initialization vector $iv_{j1}$ associated, by the function $F_{iv}$, with the address $@_j$ designated by the ordinal counter, and when said verification fails, triggering signaling of the execution fault and, when said verification succeeds, preventing said signaling of the execution fault.

4. The method as claimed in claim 1, wherein decrypting the cryptogram contained in the loaded instruction line comprises:
  decrypting the cryptogram using the initialization vector $iv_{j1}$ associated, by the function $F_{iv}$, with the address $@_j$ designated by the ordinal counter in order to obtain a decrypted masked instruction,
  executing a predetermined evolution function in order to obtain a mask derived from the loaded mask, the derived mask that is obtained being different at each execution of said evolution function, and then
  decrypting the decrypted masked instruction using the derived mask that is obtained in order to obtain the decrypted instruction executed by the arithmetic and logic unit.

5. The method as claimed in claim 4, wherein the evolution function is chosen from the group formed of:
  a swap function,
  a linear feedback shift register,
  a stream cipher,
  a bit-by-bit combination between the bits of the loaded mask and bits liable to vary upon each execution of a previous instruction of the same basic block, and
  a composition of one or more of the above functions.

6. The method as claimed in claim 5, wherein the bits liable to vary upon each execution of a previous instruction of the same basic block are chosen from the group formed of:
  bits of a previous instruction of the same basic block, and
  check bits from the execution of a previous instruction of the same basic block, these check bits being separate bits from the bits of the instructions and updated by the microprocessor upon each execution of an instruction.

7. The method as claimed in claim 1, wherein:
  each execution of the algorithm for constructing a data line to be recorded at an address $@_j$ comprises:
    calculating an initialization vector $iv_j$ using the relationship $iv_j = F_{iv}(@_j)$, where $@_j$ is the address at which the data line should be recorded in the main memory, constructing an error detection code for detecting an error in the item of data, concatenating the constructed error detection code with the item of data in order to obtain a concatenation $CD_j$, and then
    encrypting the concatenation $CD_j$ using the calculated initialization vector $iv_j$ in order to obtain the cryptogram of the item of data, and then
    incorporating the cryptogram of the item of data into the constructed data line,
  each verification that the loaded data line was actually constructed using the initialization vector $iv_j$ associated, by the function $F_{iv}$, with an address $@_j$ from which said data line was loaded is preceded by the following operations:
    calculating an initialization vector $iv_j$ using the relationship $iv_j = F_{iv}(@_j)$, where $@_j$ is the address from which the data line was loaded from the main memory, and then
    decrypting the cryptogram of the item of data contained in the loaded data line using the calculated initialization vector $iv_j$ in order to obtain a decrypted concatenation, and then
  each verification that the loaded data line was actually constructed using the initialization vector $iv_j$ associ-ated, by the function $F_{iv}$, with an address $@_j$ from which said data line was loaded comprises:
    using the error detection code contained in the decrypted concatenation to detect an error in the item of data contained in said decrypted concatenation, and if an error is detected, the verification that the loaded data line was actually constructed using the initialization vector $iv_j$ associated, by the function $F_{iv}$, with an address $@_j$ from which said data line was loaded fails and, in the opposite case, the verification succeeds.

8. The method as claimed in claim 7, wherein:
  the method comprises a phase of rearranging the main memory wherein instruction lines are moved in the main memory, said phase of rearranging the main memory comprising, for each moved instruction line:
    execution, by the arithmetic and logic unit, of an instruction to load a data line wherein the address obtained from the operand is the address $@_{j1}$ of the instruction line to be moved, and then
    verifying, in the same way as for any loaded data line, that the instruction line thus loaded was actually constructed using the initialization vector $iv_{j1}$ associated, by the function $F_{iv}$, with the address $@_{j1}$ obtained from the operand of the load instruction, and when said verification fails, triggering signaling of an execution fault and, when said verification succeeds, preventing said signaling of an execution fault, and the rearrangement phase also comprises, for each loaded instruction line:
    decrypting the cryptogram of the concatenation contained in the loaded instruction line in order to obtain a masked instruction, and then
    executing the algorithm for constructing a data line with an item of data equal to said masked instruction in order to obtain a new instruction line intended to be recorded in the main memory at an address $@_{j2}$ different from the address $@_{j1}$, and then recording the new constructed instruction line in the main memory at the address $@_{j2}$.

9. The method as claimed in claim 1, wherein the construction algorithm constructs the cryptogram of the item of data also using a secret key that is independent of the address $@_j$.

10. The method as claimed in claim 1, wherein, in step a), the recorded basic blocks comprise at least one first previous basic block, wherein
  the branch instruction is an indirect branch instruction, that is to say a branch instruction containing an operand that identifies a destination register and that, when it is executed by the microprocessor, causes a direct branch to the first encrypted instruction line of a following basic block whose address is obtained from the content of said destination register,
  the load instruction is an indirect load instruction, that is to say a load instruction containing an operand that identifies the same destination register as the one identified by the operand of the indirect branch instruction and that, when it is executed by the microprocessor, causes:
    reading of a data line associated with the address obtained from the content of the destination register, and then
    construction of a mask from the content of said read data line, and then
    loading of said constructed mask to the microprocessor, step c) additionally comprises:

executing the indirect load instruction of the first previous basic block, and then
executing the indirect branch instruction of the first previous basic block.

11. The method as claimed in claim 10, wherein the data line associated with the address obtained from the content of the destination register is the first line of each following basic block, said data line, unlike an instruction line, not coding any opcode of an instruction able to be executed by the microprocessor.

12. A non-transitory computer-readable medium that stores a binary code of a secure function able to be executed by a microprocessor in order to implement an execution method comprising:
   a) providing the binary code, the binary code that is provided comprising a machine code containing a sequence of basic blocks, wherein:
   each of the basic blocks comprises a sequence of instruction lines each containing a cryptogram of an instruction, the instructions coded in these successive instruction lines being intended to be executed automatically by the microprocessor in the order in which they appear in said basic block,
   each of the basic blocks starts at a branch address and ends with an instruction line containing the cryptogram of a branch instruction to a branch address of another basic block, said other basic block being a following basic block and the basic block that ends with the instruction line containing the cryptogram of the branch instruction to said following basic block being called a previous basic block,
   the cryptogram contained in each encrypted instruction line of a basic block depends on a mask associated with this basic block, said mask being different from the masks associated with the other basic blocks,
   the previous basic block contains an instruction line containing the cryptogram of an instruction to load the mask that, when it is executed by the microprocessor, causes loading, to the microprocessor, of the mask to be used to obtain an instruction from the cryptogram of each instruction line of the following basic block,
   b) execution of the binary code by the microprocessor, in said execution the method comprises:
   recording data in a main memory for each item of data to be recorded, the method comprising:
      executing an algorithm for constructing a data line containing the cryptogram of said item of data constructed using an initialization vector $iv_j$ associated with an address $@_j$ of the main memory using a relationship $iv_j=F_{iv}(@_j)$, where the function $F_{iv}$ is a pre-programmed function that associates a different initialization vector $iv_j$ with each different address $@_j$ of the main memory, and then
      recording said constructed data line in the main memory at the address $@_j$,
   execution, by a arithmetic and logic unit, of an instruction to load the data line, said load instruction containing an operand from which the address $@_j$ where the data line to be loaded from the main memory is recorded is obtained, followed by verifying that the loaded data line was actually constructed using the initialization vector $iv_j$ associated with said address $@_j$ by the function $F_{iv}$, and when said verification fails, triggering signaling of an execution fault and, when said verification succeeds, preventing said signaling of the execution fault,
   executing previous and following basic blocks, and when executing each instruction of the following basic block:
      loading, from the main memory, the instruction line designated by an ordinal counter of the microprocessor, followed by decrypting the cryptogram contained in the loaded instruction line using the mask loaded to the microprocessor when the previous basic block was executed, and then execution of the decrypted instruction by the arithmetic and logic unit of the microprocessor,
   wherein each instruction line of a basic block is constructed by executing a same construction algorithm as the one executed to construct the data line and using a same function $F_{iv}$, the item of data for said purpose being taken to be equal to the instruction masked using the mask associated with said basic block, such that loading said instruction line by executing an instruction to load a data line does not automatically trigger signaling of the execution fault.

13. A microprocessor being configured so as to execute a binary code of a secure function by performing the following steps:
   a) providing the binary code, the binary code that is provided comprising a machine code containing a sequence of basic blocks, wherein:
   each of the basic blocks comprises a sequence of instruction lines each containing a cryptogram of an instruction, the instructions coded in these successive instruction lines being intended to be executed automatically by the microprocessor in the order in which they appear in said basic block,
   each of the basic blocks starts at a branch address and ends with an instruction line containing the cryptogram of a branch instruction to a branch address of another basic block, said other basic block being a following basic block and the basic block that ends with the instruction line containing the cryptogram of the branch instruction to said following basic block being called a previous basic block,
   the cryptogram contained in each encrypted instruction line of a basic block depends on a mask associated with this basic block, said mask being different from the masks associated with the other basic blocks,
   the previous basic block contains an instruction line containing the cryptogram of an instruction to load the mask that, when it is executed by the microprocessor, causes loading, to the microprocessor, of the mask to be used to obtain an instruction from the cryptogram of each instruction line of the following basic block,
   b) execution of the binary code by the microprocessor, in said execution the method comprises:
   recording data in a main memory for each item of data to be recorded, the method comprising:
      executing an algorithm for constructing a data line containing the cryptogram of said item of data constructed using an initialization vector $iv_j$ associated with an address $@_j$ of the main memory using a relationship $iv_j=F_{iv}(@_j)$, where the function $F_{iv}$ is a pre-programmed function that associates a different initialization vector $iv_j$ with each different address $@_j$ of the main memory, and then
      recording said constructed data line in the main memory at the address $@_j$,
   execution, by a arithmetic and logic unit, of an instruction to load the data line, said load instruction containing an operand from which the address $@_j$ where the data line to be loaded from the main memory is recorded is obtained, followed by verifying that the loaded data line was actually constructed using the initialization vector $iv_j$ associated with said address $@_j$ by the function $F_{iv}$, and when said verification fails, triggering signaling of an execution fault and, when said verification succeeds, preventing said signaling of the execution fault, executing previous and following basic blocks, and when executing each instruction of the following basic block:
loading, from the main memory, the instruction line designated by an ordinal counter of the microprocessor, followed by decrypting the cryptogram contained in the loaded instruction line using the mask loaded to the microprocessor when the previous basic block was executed, and then execution of the decrypted instruction by the arithmetic and logic unit of the microprocessor, wherein each instruction line of a basic block is constructed by executing a same construction algorithm as the one executed to construct the data line and using a same function $F_{iv}$, the item of data for said purpose being taken to be equal to the instruction masked using the mask associated with said basic block, such that loading said instruction line by executing an instruction to load a data line does not automatically trigger signaling of the execution fault.

\* \* \* \* \*